US005533334A

United States Patent [19]

Takeuchi et al.

[11] Patent Number: 5,533,334

[45] Date of Patent: Jul. 9, 1996

[54] PRESSURIZED FLUID SUPPLY SYSTEM

[75] Inventors: Masamitsu Takeuchi; Kazunori Ikei; Tadao Karakama; Mitsumasa Akashi; Teruo Akiyama; Jun Maruyama; Keisuke Taka, all of Kawasaki, Japan

[73] Assignee: Kabushiki Kaisha Komatsu Seisakusho, Tokyo, Japan

[21] Appl. No.: 302,912

[22] PCT Filed: Apr. 8, 1993

[86] PCT No.: PCT/JP93/00452

§ 371 Date: Sep. 19, 1994

§ 102(e) Date: Sep. 19, 1994

[87] PCT Pub. No.: WO93/21446

PCT Pub. Date: Oct. 28, 1993

[30] Foreign Application Priority Data

| | | | |
|---|---|---|---|
| Apr. 8, 1992 | [JP] | Japan | 4-29640 U |
| May 29, 1992 | [JP] | Japan | 4-161925 |
| May 29, 1992 | [JP] | Japan | 4-161926 |

[51] Int. Cl.$^6$ .................. F16D 31/02

[52] U.S. Cl. .................. 60/426; 60/452; 91/517; 91/446

[58] Field of Search .................. 60/422, 426, 452; 91/446, 517, 532

[56] References Cited

U.S. PATENT DOCUMENTS

| | | | |
|---|---|---|---|
| 4,020,867 | 5/1977 | Sumiyoshi | 91/446 |
| 5,038,671 | 8/1991 | Ueno | 91/517 |
| 5,138,837 | 8/1992 | Obertrifter et al. | 91/446 |

FOREIGN PATENT DOCUMENTS

| | | |
|---|---|---|
| 60-11706 | 1/1985 | Japan . |
| 62-202574 | 12/1987 | Japan . |
| 3-144023 | 6/1991 | Japan . |

*Primary Examiner*—F. Daniel Lopez

*Attorney, Agent, or Firm*—Frishauf, Holtz, Goodman, Langer & Chick

[57] ABSTRACT

A pressurized fluid supply system, in which a plurality of pressure compensation valves are connected to a pump discharge line of a hydraulic pump in parallel, and direction control valves are provided at the outlet side of each pressure compensation valve to supply a discharged pressurized fluid from the hydraulic pump to a plurality of actuators. The pressure compensation valves include a check valve portion establishing and blocking communication between the pump discharge line and the inlet port of the direction control valve, and a pressure reduction valve portion for supplying a reduced pressure from the pump discharge line. The check valve portion shifts in a valve opening direction in response to an inlet pressure and shifts in a valve closing direction in response to an outlet pressure. The pressure reduction valve portion has a first and a second pressure chamber. Pressure in the first pressure chamber urges a valve element toward a position establishing communication between the inlet side and the outlet side, and a pressure in the second pressure chamber cooperates with a spring to urge the valve element to a position blocking communication between the inlet side and the outlet side, and biasing the check valve portion toward the valve closing direction. A load pressure of the actuator, to which the pressurized fluid is supplied, is introduced into the first pressure chamber and fluidly connects all of the second pressure chambers together.

12 Claims, 14 Drawing Sheets

PRESSURIZED FLUID SUPPLY SYSTEM

FIELD OF THE INVENTION

The present invention relates to a hydraulic pressure supply system for distributing a pressurized fluid discharged from one or more hydraulic pumps to a plurality of actuators. More specifically, the invention relates to a pressurized fluid supply system for distributing a pressurized fluid discharged from one or more hydraulic pumps to left and right hydraulic motors for traveling and a work implement cylinder.

BACKGROUND ART

Japanese Unexamined Patent Publication (Kokai) No. Showa 60-11706 discloses a pressurized fluid supply system of the type set forth above. FIG. 1 shows the pressurized fluid supply system disclosed in the above-identified publication. A plurality of pressure compensation valves 3 and 13 are connected in parallel to a discharge line pipe 2 of a hydraulic pump 1. Discharge pipes 4 and 14 of respective pressure compensation valves 3 and 13 are provided with direction control valves 5 and 15. The outlet sides of the direction control valves 5 and 15 are connected to actuators 6 and 16. The pressure compensation valves 3 and 13 are constructed to be biased in valve opening direction by a pump discharge pressure and outlet pressures of the direction control valves 5 and 15 and to be biased in valve closing direction by the inlet pressures of the direction control valves and the highest load pressure. With the shown pressurized fluid supply system, it becomes possible to supply pressurized fluid discharged from the pump to respective actuators at a predetermined distribution ratio when a plurality of direction control valves 3 and 13 are operated simultaneously.

However, in the above-mentioned pressurized fluid supply system, it becomes essential to provide a shuttle valve 7 for comparing load pressures of respective actuators and supplying the highest load pressure to the pressure compensation valves. Furthermore, the number of shuttle valves required becomes one less than the number of actuators. Therefore, number of necessary shuttle valves is inherently increased according to increasing of the number of the actuators to be supplied with the pressurized fluid, thus increasing cost.

On the other hand, in the pressurized fluid supply system illustrated in FIG. 1, assuming that the load pressure of the actuator 6 is higher than the load pressure of the actuator 16 among the load pressures generated upon actuation of two actuators 6 and 16, a pressure in a passage 8 is introduced into a passage 9 via the shuttle valve 7 as the maximum load pressure. Subsequently, if the load pressure fluctuates and the load pressure of the actuator 16 becomes higher than the load pressure of the actuator 6, the shuttle valve 7 is switched to connect the passage 9 and a passage 18. Upon this switching, due to blow off of the shuttle valve 7, the pressure in the passage 18 drops, and the pressure in the other passage 8 is blocked. As a result, upon switching of the shuttle valve 7, the actuator 6 transitively causes a natural drop and the natural drop is accelerated.

SUMMARY OF THE INVENTION

An object of the present invention is to solve the above-mentioned problem in the prior art and thus to provide a pressurized fluid supply system which can distribute pressurized fluid discharged from a hydraulic pump to a plurality of actuators without employing any shuttle valve.

Another object of the invention is to provide a pressurized fluid supply system which can prevent transitive natural drop of an actuator upon switching between load pressures.

A further object of the invention is to provide a pressurized fluid supply system which can prevent a discharge amount of the hydraulic pump from being excessively decreased by generating a control pressure lower than a pressure corresponding to a load on a work implement even when the work implement is operated during travel of a working vehicle, and prevent abrupt variation of flow rates of the pressurized fluid supplied to left and right hydraulic motors so as not to cause excessive deceleration shock.

In order to accomplish the above-mentioned objects, according to the first aspect of the invention, a pressurized fluid supply system, in which a plurality of pressure compensation valves are connected to a pump discharge line of a hydraulic pump in parallel, direction control valves being provided at the outlet side of each pressure compensation valves to supply a discharged pressurized fluid from the hydraulic pump to a plurality of actuators, comprises:

- the pressure compensation valve being provided a check valve portion establishing and blocking communication between the pump discharge line and the inlet port of the direction control valve, and a pressure reduction valve portion reducing the pressure of the pump discharge pressure;
- the check valve portion being constructed for shifting in a valve opening direction in response to an inlet pressure and shifting in a valve closing direction in response to an outlet pressure;
- the pressure reduction valve portion being contacted with the check valve portion by means of a spring, urged by a pressure of one pressure chamber for communicating between inlet side and outlet side and shifting away from the check valve portion, and urged by a pressure of the other pressure chamber for blocking communication between the inlet side and the outlet side and biasing the check valve portion in the valve closing direction; and
- a load pressure of the actuator, to which the pressurized fluid is supplied, being introduced into the one pressure chamber and communicating between the other pressure chambers of respective valve blocks.

According to the second aspect of the invention, a pressurized fluid supply system comprises:

- a valve block;
- a direction control valve constructed by forming a spool bore, a check valve receptacle bore and a reduction valve receptacle bore in the valve block, opening a pump port, first and second load pressure detection ports, first and second actuator ports and first and second tank ports to the spool bore, and slidably inserting a main spool in the spool bore for selectively establishing and blocking communication between the respective ports;
- a check valve portion forming in the valve block a fluid passage communicating a first port opening to the check valve receptacle bore and the pump port, and inserting a spool for establishing and blocking communication between the first port and the fluid passage in the check valve receptacle bore, the spool being stopped at the blocking position;
- a pressure reduction valve portion constructed by forming second and third ports opening to the pressure reduction valve receptacle bore in the valve block, defining first and second pressure chambers at opposite ends of a spool inserted in the pressure reduction valve receptacle bore, the first pressure chamber being communicated with the second load pressure detection port and the second pressure chamber being communicated with the third port, and contacting the spool disposed within the pressure reduction valve receptacle bore to the check valve and biasing the same in the valve closing direction of the check valve portion by a spring;

the check valve portion and the pressure reduction valve portion forming a pressure compensation valve;

the configuration of the spool of the pressure reduction valve portion being a configuration for establishing communication between the first pressure chamber and the second port when the spool slides against the spring force of the spring by the pressure of the first pressure chamber; and a discharge line of a hydraulic pump being connected to the first ports of a pair of valve blocks, second ports of a pair of valve blocks being communicated with each other, and third ports of a pair of valve block being communicated with a load detection passage.

According to the third aspect of the invention, a pressurized fluid supply system for distributing pressurized fluid to actuators constituted of a pair of left and right hydraulic motors for driving left and right driving wheels and a actuator constituted of a work implement cylinder for driving a work implement, comprises:

a valve block;

a direction control valve constructed by forming a spool bore, a check valve receptacle bore and a reduction valve receptacle bore in the valve block, opening a pump port, first and second load pressure detection ports, first and second actuator ports and first and second tank ports to the spool bore, and slidably inserting a main spool in the spool bore for selectively establishing and blocking communication between the respective ports;

a check valve portion forming in the valve block a fluid passage communicating a first port opening to the check valve receptacle bore and the pump port, and inserting a spool for establishing and blocking communication between the first port and the fluid passage in the check valve receptacle bore, the spool being stopped at the blocking position;

a pressure reduction valve portion constructed by forming second and third ports opening to the pressure reduction valve receptacle bore in the valve block, defining first and second pressure chambers at opposite ends of a spool inserted in the pressure reduction valve receptacle bore, the first pressure chamber being communicated with the second load pressure detection port and the second pressure chamber being communicated with the third port, and contacting the spool disposed within the pressure reduction valve receptacle bore to the check valve and biasing the same in the valve closing direction of the check valve portion by a spring;

the check valve portion and the pressure reduction valve portion forming a pressure compensation valve;

in the spool of the pressure reduction valve portion of a pair of valve blocks supplying the pressurized fluid for the hydraulic motors for traveling, a communication passage for communicating the third port and the first pressure chamber being formed and a check valve which opens when the pressure of the third port is higher than the pressure of the second portion, being provided in the communication passage;

a discharge line of a hydraulic pump being connected to the first port of the pair of valve blocks and to first and second ports of the valve block for supplying the pressurized fluid for the work implement cylinder, the third port of each of the valve blocks being connected to a load detection passage, and the second ports of the pair of left and right valve blocks being communicated with each other.

According to a fourth aspect of the invention, a pressurized fluid supply system for distributing pressurized fluid from a pressurized fluid source to a first hydraulic load and a second hydraulic load at first and second line pressures depending upon respective load pressures, comprises:

first valve means for supplying the first line pressure to the first hydraulic load;

second valve means for supplying the second line pressure to the second hydraulic load;

first load pressure introducing means connected to the first hydraulic load for introducing a first load pressure;

second load pressure introducing means connected to the second hydraulic load for introducing a second load pressure;

first line pressure generating means disposed between the pressurized fluid source and the first valve means and connected to the first load pressure introducing means for generating a first line pressure on the basis of a supply pressure supplied from the pressurized fluid source and the first load pressure for supplying the first valve means with the first line pressure;

second line pressure generating means disposed between the pressurized fluid source and the second valve means and connected to the second load pressure introducing means for generating a second line pressure on the basis of a supply pressure supplied from the pressurized fluid source and the second load pressure for supplying the second valve means with the second line pressure; and discharge pressure control means for controlling discharge pressure of the pressurized fluid source depending upon the first and second line pressures generated by the first and second line pressure generating means.

The first and second valve means may comprise direction control valves for reversing operating directions of corresponding first and second hydraulic loads by reversing supply direction of the pressurized fluid. Also, the first and second line pressure generating means may comprise pressure compensation valves, each having a check valve portion and a pressure reduction valve portion.

In the preferred construction, the pressure reduction valve portion has a load pressure feedback chamber and a supply pressure chamber opposing to opposite ends of a pressure reduction valve body, and shifting the pressure reduction valve body depending upon the load pressure introduced via corresponding one of the first and second load pressure introducing means for establishing and blocking communication between the supply pressure chamber and the pressurized fluid source to generate a pilot pressure to be supplied to the discharge pressure control means. Also, it is preferred that the check valve portion comprises a valve opening side pressure chamber exerting a supply pressure of the pressurized fluid source to a check valve body in valve opening direction, and means for exerting a force corresponding to a pressure difference between the pressure of the load pressure feedback chamber of the pressure reduction valve portion and the pressure of the supply pressure chamber to the check valve body in valve closing direction, for generating the first and second line pressures depending upon the supply pressure and the pressure difference.

Furthermore, the pressure reduction valve body of the pressure reduction valve portion may be constructed to displace depending up the pressure difference between the pressure of the load pressure feedback chamber and the pressure of the supply pressure chamber, the pressure reduction valve body being shifted in opening direction when the pressure of the load pressure feedback chamber becomes higher beyond a predetermined pressure difference relative to the pressure of the supply pressure chamber, for establishing communication between the pressurized fluid source and the supply pressure chamber. Also, the pressure reduction valve portion may be provided with a supply side port communicated with the supply pressure chamber and a feedback side port communicated with the load pressure feedback chamber at the valve open position, the supply side port of the first line pressure generating means and the supply side port of the second line pressure generating means are communicated with each other, and the feedback side ports of the first and second line pressure generating means are commonly connected to the discharge pressure control means. Furthermore, the pressure reduction valve portion may be provided with a supply side port communicated with the supply pressure chamber and a feedback side port communicated with the load pressure feedback chamber at the valve open position, a communication passage for communicating the feedback side port to the supply side chamber, and a check valve is disposed in the communication passage so that the check valve opened when the pressure at the feedback side port is higher than the pressure of the supply side port.

According to the fifth aspect of the invention, a multiple valve, including first and second valve means respectively constructed by inserting spools in spool bores of first and second valve bodies, the first and second valve bodies of the first and second valve means being provided with inlet ports, tank ports and first and second blocks having mounting holes, the blocks and respective valve body being fixedly coupled by means of stud bolts, comprises:

the first block being formed with a threaded hole for the stud bolt on one side surface, and a threaded hole for a cover bolt on the other side surface, the first block being formed with a pump passage, a main passage and a tank passage extending between the one side surface and the other side surface, a stud bolt extending through the second block being engaged with the threaded hole for the stud bolt, and a cover having a cut-out groove for communicating the pump passage and the main passage is fixedly mounted on the other side surface of the first block by engaging a cover bolt to the threaded hole for the cover bolt.

In the construction set forth above, each of the valve body may be formed with a pump passage, a main passage, a tank passage and a bolt receptacle hole extending through opposite sides thereof, the valve body may be arranged at the other side surface of the first block, the cover is arranged to the valve body arranged at the other side surface of the first block the cover and the valve body may be mounted by passing a longer cover bolt though the cover and the bolt receptacle hole and by engaging the cover volt to the threaded hole for the cover bolt.

BRIEF DESCRIPTION OF THE DRAWING

The present invention will be understood more fully from the detailed description given herebelow and from the accompanying drawings of the preferred embodiment of the present invention, which, however, should not be taken to be limitative to the invention, but are for explanation and understanding only.

In the drawings.

BEST MODE FOR IMPLEMENTING THE INVENTION

The preferred embodiments of the present invention will be discussed hereinafter with reference to FIG. 2 and subsequent figures.

Figure 1:
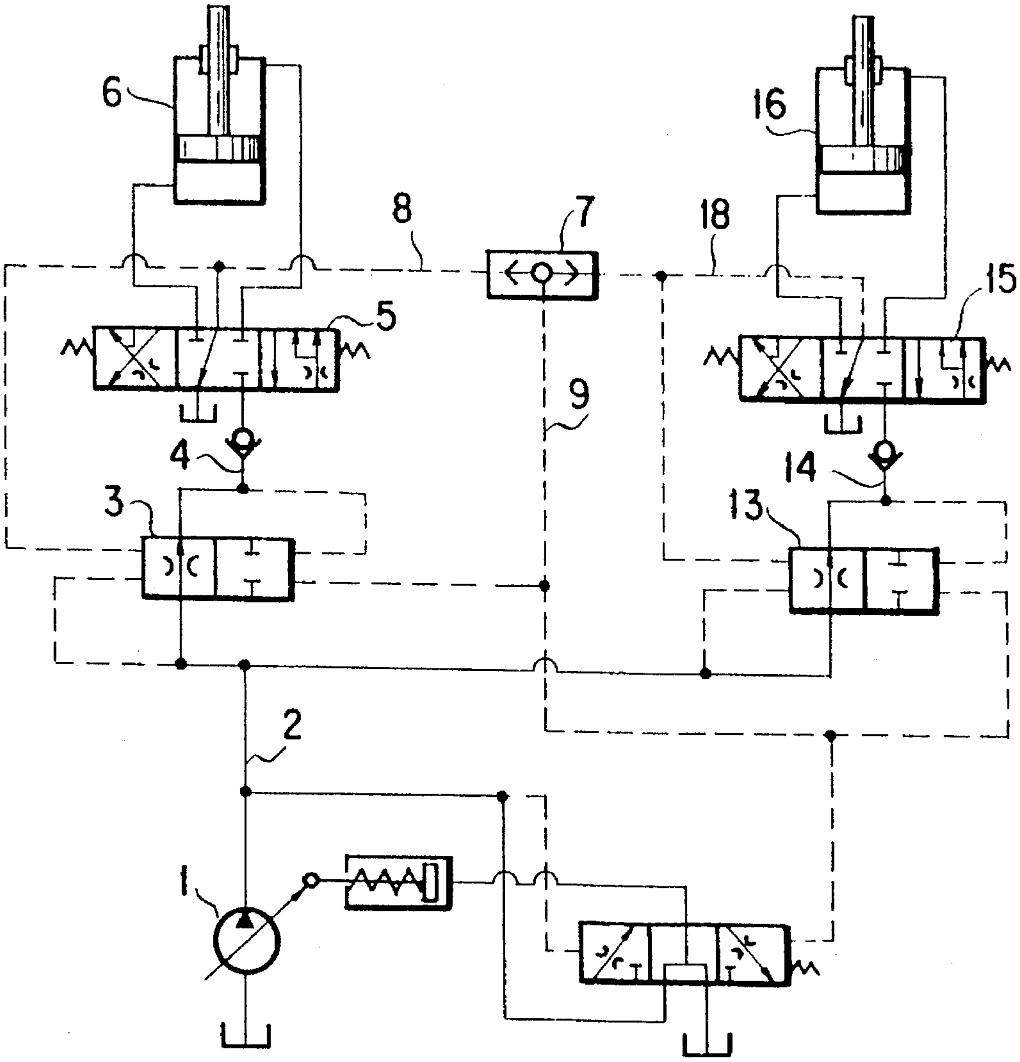
FIG. 1 PRIOR ART
FIG. 1 is a hydraulic system diagram showing one example of the conventional pressurized fluid supply system.
Figure 2:
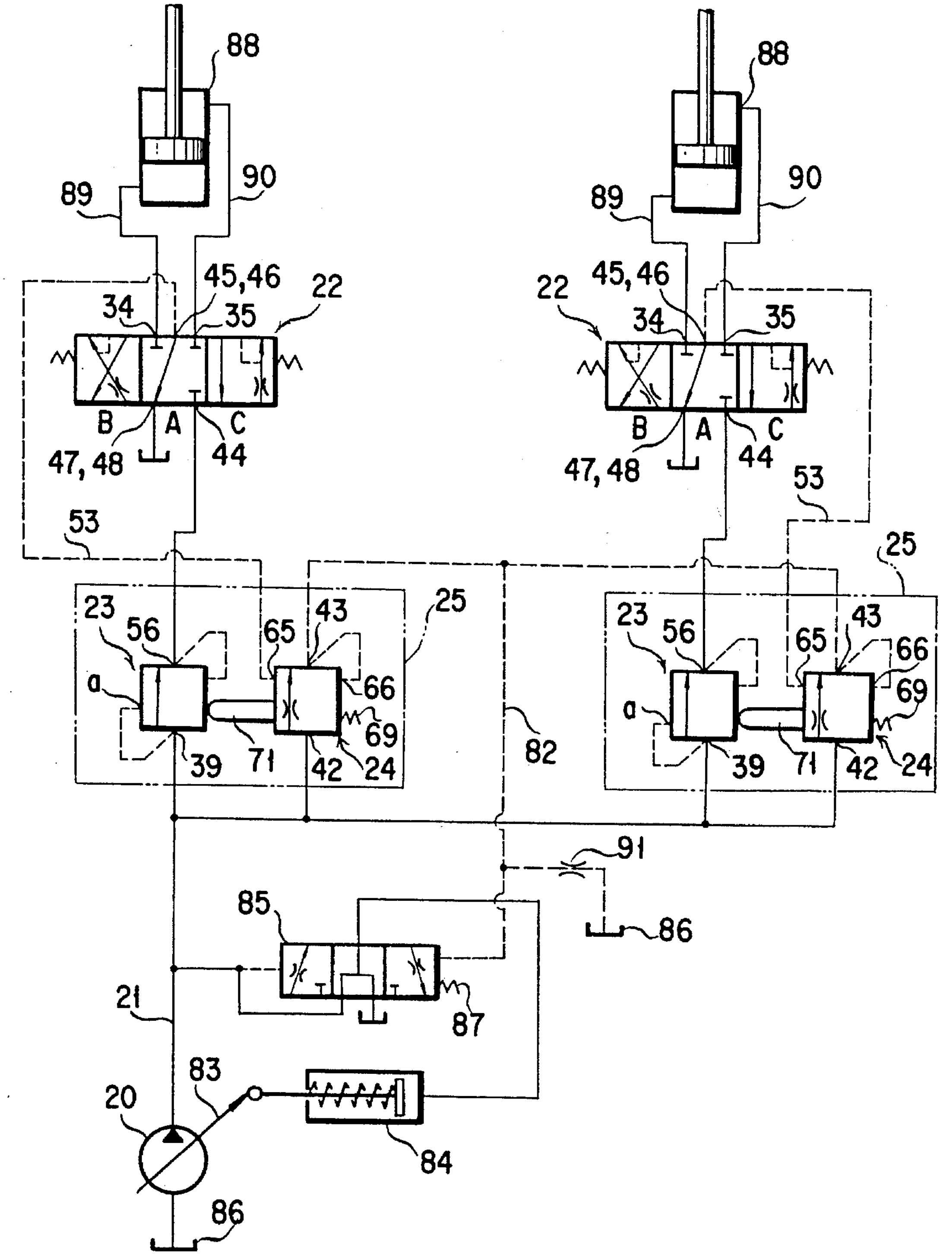
FIG. 2 is a hydraulic system diagram of the first embodiment of a pressurized fluid supply system according to the present invention.

As shown in FIG. 2, a pressurized fluid supply system is provided with a plurality of direction control valves 22 in a discharge line 21 of a hydraulic pump 20. At the inlet side of each direction control valve 22, a pressure compensation valve formed with check valve 23 and a pressure reduction valve portion 24 is provided. The direction control valve 22 and the pressure compensation valve 25 are formed as an integral unit as shown in FIG. 3.

Figure 3:
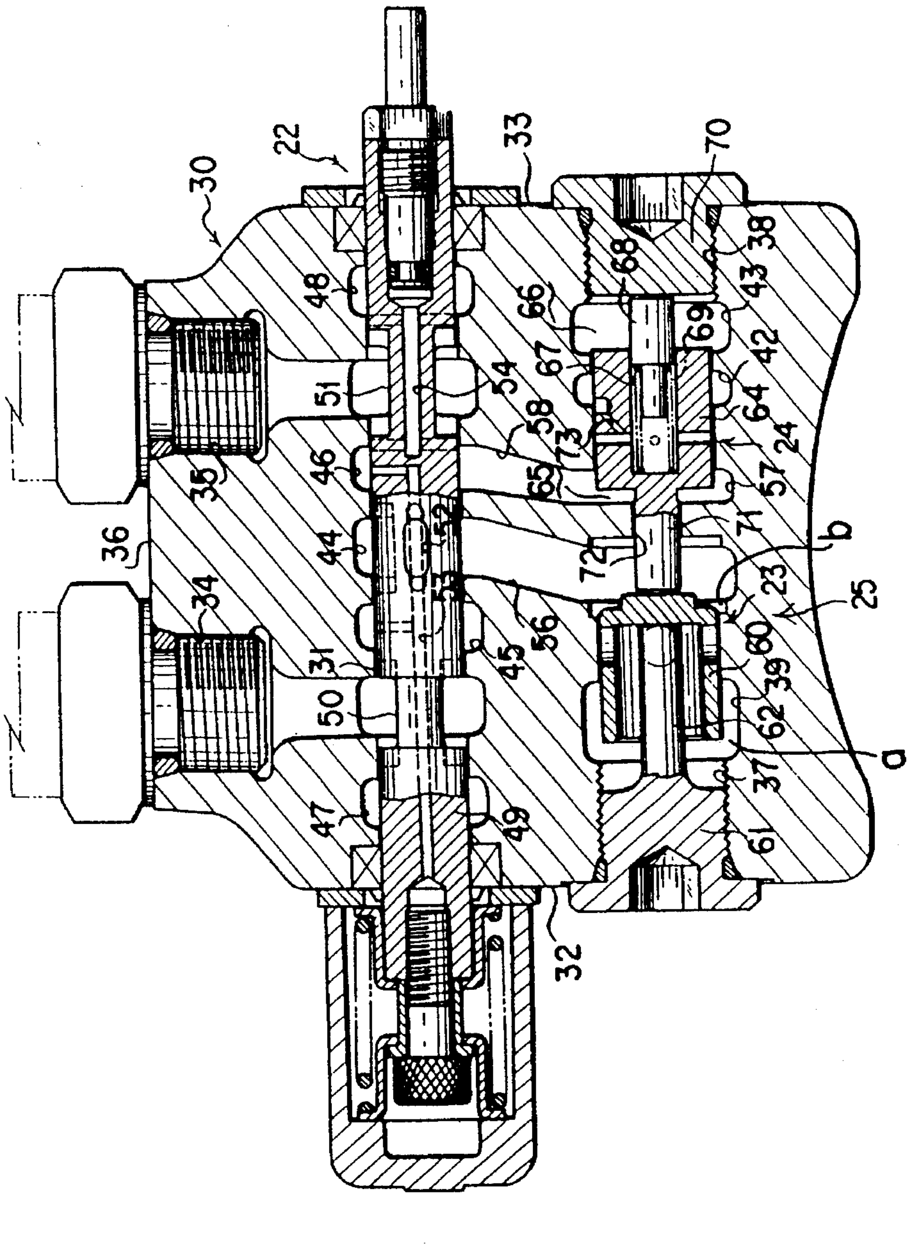
FIG. 3 is a section showing an embodiment of a pressure compensation valve and a pressurized fluid supply system.

As shown in FIG. 3, a valve block 30 is formed into a substantially parallel piped configuration. In the vicinity of the upper portion of the valve block 30, a spool bore 31 is formed. The spool bore 31 opens at left and right side surfaces 32 and 33. First and second actuator ports 34 and 35 open to the spool bore 31 at respective inner ends thereof and open to the upper surface of the valve block 31. In the vicinity of the lower portion of the valve block 30, a check valve receptacle bore 37 opening at the left side surface 32 and a pressure reduction valve receptacle opening 37 opening to the right side surface 33 are formed in alignment with each other. A first port 39 opens to the check valve receptacle bore 37 at the inner end thereof and to respective of front and rear surfaces of the valve block at the outer end portions. Similarly, the second and third ports 42 and 43 are open to the reduction valve receptacle bore 38 at respective inner end portions, and to the front and rear surfaces of the valve block 30 at the outer ends, respectively. These first, second and third ports 39, 42 and 43 are adapted to communicate with respective of first, second and third ports 39, 42 and 43 of adjacent valve block when a plurality of valve blocks 30 are connected in longitudinal direction to form a multi-stage valve construction.

The valve block 30 is further formed with a pump port 44 opening to the spool bore 31, first and second load pressure detecting ports 45 and 46, the first and second actuator ports 34 and 35, and first and second tank ports 47 and 48. In the spool bore 31, a main spool 49 is received in slidable fashion. The main spool 49 has first and second small diameter portions 50 and 51 and a communication groove 52. Furthermore, the main spool 49 is formed of a first fluid passage 53 constantly communicating the first and second load pressure detection ports 45 and 46 and a second fluid passage 54 selectively communicating and blocking between the second load pressure detection portion 46 and the second tank port 48. The main spool 49 is biased toward a neutral position by means of a spring. At the neutral position, the main spool 49 blocks respective ports, and communicates the second load pressure detection port 46 and the second tank port 48 via the second fluid passage 54. The main spool 49 slides laterally. At a first pressurized fluid supply position where the main spool 49 is shifted toward the right, the second actuator port 35 is communicated with the second tank port via the second small diameter portion 51, and the first actuator port 34 is communicated with the first load pressure detection port 45 via the first small diameter portion 50. Also, the communication between the first load detection port 46 and the second tank port 48 is blocked. On the other hand, at the second pressurized fluid supply position where the main spool 49 is shifted toward left, the first actuator port 34 and the first tank port 47 are communicated via the first small diameter portion 50, the second actuator port 35 is communicated with the second load pressure detection port 46 via the second small diameter portion 51, and communication between the first load pressure detection port 46 and the second tank port 48 is blocked. The spool bore 31 and the main spool 49 form the direction control valve 22 with the construction set forth above.

On the other hand, the check valve receptacle bore 37 is communicated with pump port 4 via a fluid passage 56. For the check valve receptacle bore 37, a check valve 60 is engaged for selectively communicating and blocking between the first pump port 39 and the pump port 44. The check valve 60 is restricted sliding movement toward left beyond the shown position by means of a stopper rod provided on a plug 61, and is normally placed at a blocking position. With this check valve receptacle bore 37 and the check valve 60, the check valve portion 23 is formed.

The pressure reduction valve receptacle bore 38 is communicated with the second load pressure detecting port via a fourth port 57 and a fluid passage 58. In the pressure reduction valve receptacle bore 38, a spool 64 is slidably inserted to form a first pressure chamber 65 and a second pressure chamber 66. The first pressure chamber 65 is communicated with the fourth port 57, and the second pressure chamber 66 communicates with a third port. The spool 64 is formed with a blind bore 67. In the blind bore 67, a free piston 68 is inserted. the free piston 68 is biased toward a plug 70 by means of a spring 69 inserted in the bottom portion of the blind bore 67. Furthermore, the spool 64 is formed integrally with a push rod 71. The push rod 71 is inserted through a through opening 72 formed in a partitioning wall of the valve block 30 and contact its tip end to the check valve 60. The spool 64 is further formed with an orifice 73 for communicating the second port 42 and the blind bore 67. With the construction set forth above, the pressure reduction valve portion 24 is formed. Furthermore, with this pressure reduction valve portion 24 and the check valve portion 23, the pressure compensation valve 25 is formed.

As shown in FIG. 2, the discharge line 21 of the hydraulic pump 20 is communicated with the first and second ports 39 and 42, the third port 43 is connected to the load pressure detecting passage 82, and the first and second actuator ports 34 and 35 are connected to actuators 88. It should be noted that, in FIG. 2, the reference numeral 83 denotes a swash plate for controlling discharge amount of a hydraulic pump 80, 84 denotes a servo cylinder, and 85 denotes a direction control valve for adjusting the pump.

The operation of the preferred embodiment of the pressurized fluid supply system illustrated in FIG. 2 will be discussed in terms of respective operation modes.

(1) When Spool of Direction Control Valve 22 is in Neutral Position

A working fluid sucked from a tank 86 by the hydraulic pump 20 is introduced into the opening side pressure chamber a of the check valve 23 via the discharge line 21. At this time, the pressure chambers 65 and 66 of the pressure reduction valve 24 are open to the tank 86. Accordingly, the pressures in the pressure chambers 65 and 66 are held at the atmospheric pressure (hydraulic pressure is zero). At this condition, the spool 64 of the pressure reduction valve 24 is biased toward the check valve portion 23 by a relatively small spring force of a spring 69. Then, the push rod 71 is simply contacted to the check valve 60.

On the other hand, the discharge pressure of the hydraulic pump 20 is maintained a pressure difference relative to the pressure in the load pressure detection passage 82 constant by a spring 87 of the direction control valve 85 for adjusting the pump. Here, assuming that the pressure difference is 20 $kg/cm^2$, since the pressure in the load pressure detecting passage 82 is held at atmospheric pressure (zero), the pump discharge pressure is risen up to 20 $kg/cm^2$. In conjunction therewith, the pump discharge pressure is introduced into the pressure chamber a of the check valve portion 23 to shift the check valve 60 until the inlet pressure (outlet pressure of the check valve portion 23) of the direction control valve 22 becomes equal to the pump discharge pressure. When the pump discharge pressure and the inlet pressure of the direction control valve 22 become equal to each other, the shift of the check valve 60 is stopped at a condition contacting with the push rod 71 of the spool 64 of the pressure reduction valve portion 24 by the spring 69.

The pressure reduction valve portion 24 establishes a fluid communication between the discharge line 21 of the hydraulic pump 20 with the pressure chamber 66 only at the stroke end. On the other hand, the check valve 23 communicates the pump discharge line 21 to the outlet side. Accordingly, while the direction control valve 22 is in the neutral position, the pump discharge line 21 and the pressure chamber 88 will never been established, and the pressure in the pressure chamber 65 is maintained at zero (atmospheric pressure).

(2) When Spool of Only One of Direction Control valves 22 is in First Pressurized Fluid Supply Position B Here, it is assumed that the spool of the left side direction control valve 22 is sifted to the first pressurized fluid supply position B, and the spool of the right side direction control valve 22 is maintained at the neutral position A.

By the shift of the spool of the direction control valve 22, the pump port 44 and the first actuator port 34 are connected. At the same time, the second actuator port 35 and the second tank port 48 are connected. At this time, when the pressure (load pressure) in a conduit 89 connecting the first actuator port 34 and the actuator 88 is greater than the pump discharge pressure (20 kg/cm$^2$), the check valve 60 of the check valve portion 23 is seated by the pressure of the pressure chamber b, the natural drop of the actuator 88 can be prevented.

The pressure of the conduit 89 of the actuator 88, namely, the load pressure is introduced into one pressure chamber 65 of the pressure reduction valve portion 24 via the first fluid passage 53 and the path 58. At this time, since the pressure of the other pressure chamber 66 becomes zero, the spool 64 of the pressure reduction valve portion 24 shifts to the stroke end in the side remote from the check valve portion. By this, the pump discharge passage 21 and the load pressure detecting path 82 are communicated with each other via the throttle valve of the pressure reduction valve 24. When the pressure in the conduit 89 is higher than the pump discharge pressure (20 kg/cm$^2$), the check valve 60 of the check valve portion 23 is blocked by the pressure in the pressure chamber b, and this pressure is introduced into one pressure chamber 65 of the pressure reduction valve portion 24. Accordingly, even when the other pressure chamber 66 is communicated with the pump discharge line 21, the spool of the pressure reducing valve 24 is maintained in the sifted position. On the other hand, when the pressure (load pressure) in the passage 41 is lower than the pump discharge pressure, the load pressure is introduced into one pressure chamber 65 of the pressure reduction valve portion 24. By this, the spool 64 of the pressure reduction valve portion 24 shifts in response to the pressure of the pressure chamber 65. On the other hand, when the pressure in the other pressure chamber 66 is risen to the pressure (namely, load pressure) of one pressure chamber 65, the pressure reduction valve portion 24 becomes blocked state by the small spring force of the spring 69 to contact the push road 71 to the check valve 60 of the check valve portion In either case, the pressure reduction valve portion 24 maintains communication between the pump discharge line 21 and the pressure chamber 66 until the pressure of one pressure chamber 65 becomes equal to the pressure of the other pressure chamber 66. When the pressures in both pressure chambers 65 and 66 are equal to each other, the spool of the pressure reduction valve portion 24 becomes the blocked position by the small spring force of the spring 69 to contact the push rod 71 provided on the spool 64 to the check valve 60. As a result, the pressure of the load pressure detecting passage 82 becomes equal to the load pressure, and the pump discharge pressure is controlled at a pressure higher than the pressure of the load pressure detecting passage 82 in the extent of a certain pressure difference (e.g. 20 kg/cm$^2$) by the direction control valve 85 for adjustment of the pump. Since the pump discharge pressure is introduced into the pump port 44 via the check valve portion 23, the pressure difference (20 kg/cm$^2$) between the inlet pressure and the outlet pressure (load pressure) of the direction control valve 22 can be maintained. Accordingly, only by variation of the opening area of a throttle between the inlet side and the outlet side associated with shift of the spool of the direction control valve 22, the flow rate of the pressurized fluid to be distributed to the actuators 88 is controlled.

When the spool of the direction control valve 22 is sifted, the conduit 89 or 90 of the actuator 88 is connected to the second fluid passage 54 for introducing then load pressure. On the other hand, the second fluid passage 54 is connected to one pressure chamber 65 of the pressure reduction valve 24. However, since the load pressure is used only as a pilot pressure (set pressure of the pressure reduction valve) in the pressure reduction valve 24, the draining of the pressure will never been caused. Accordingly, upon shifting the spool of the direction control valve 22, the natural drop of the actuator 88 due to drop of the load pressure will never been caused.

The load pressure detecting passage 82 is also connected to the other pressure chamber 88 of the pressure reduction valve portion 24 of the pressure compensation valve 25 arranged in the other direction control valve 22. However, since one pressure chamber 65 of the pressure reduction valve portion 24 is communicated with the tank 88 by the direction control valve 22 in the neutral position A, the pressure in the first fluid passage 53 for introducing the load pressure is held zero, and thus the spool of the pressure reduction valve portion 24 biases the check valve of the check valve portion 23 to the valve closing direction by the pressure of the pressure chamber 65.

On the other hand, in the pressure chamber a generating the pressure for biasing the check valve of the check valve portion 23 in the valve opening direction, the discharge pressure of the pump 20 is introduced from the pump discharge line 21. Therefore, as a whole, with the pressure difference (20 kg/cm$^2$) between the pump discharge pressure and the pressure of the load pressure detecting passage 82, the check valve of the check valve portion 23 and the spool of the pressure reducing valve portion 24 are sifted in the valve opening direction of the check valve 60. However, the shift is quite small so that the check valve is opened with the small spring force of the spring 69 when the pressure of the pump port 44 reaches the predetermined pressure difference. Accordingly, the spool of the pressure reduction valve portion 24 will never be sifted to the stroke end by the pressure in the pressure chamber a of the check valve portion 23. Therefore, it will never influence for the hydraulic pressure control by the direction control valve 22.

(3) When Spools of Both Direction Control Valves 22 are in the First Pressurized Fluid Supply Positions B (3)-1 When Total of Necessary Flow Rate of Respective Actuators 88 is the Maximum Discharge Flow Rate of Hydraulic Pump 20

Here, it is assumed that the spools of both of the direction control valves 22 are sifted to the first pressurized fluid supply positions B, and respective pump ports 44, the conduits 89, the first fluid passages 53 for introduction of the load pressure are connected.

The spool of the pressure reduction valve portion 24 of the pressure compensation valve 25 of one of the direction control valves 22 is maintained at the sifted position at the stroke end until the pressure in the pressure chamber 66 becomes equal to the pressure of one of pressure chambers 65 of both pressure compensation valves, and until the pressure of the pressure chamber 66 of the pressure compensation valve 25 of the other direction control valve 22 becomes equal to the pressure of one of the pressure chambers 65 similarly to the former. Here, it is assumed that among shown two actuators 88, the load pressure of the left side actuator is greater than the load pressure of the right side actuator. In order to facilitate the following discussion, it is further assumed that the load pressure of the left side actuator 88 is 100 kg/cm$^2$ and the load pressure of the right side actuator is 10 kg/cm$^2$. Since the load pressure detecting passage 82 is connected to the tank 86 via an orifice 91, the pressure of the load pressure detecting passage 82 is held zero (atmospheric pressure) before the spools of the direction control valves 22 are sifted. Accordingly, respective pressure reduction valve portions 24 may communicate the pump discharge pressure with the pressure of the pressure detecting passage 82.

When the pressure of the load pressure detecting passage 82 is risen to the pressure (10 kg/cm$^2$) of the conduit 90 of the right side actuator 88, the pressure reduction valve portion 24 of the right side pressure compensation valve 25 is closed, at first. At this time, the spool of the pressure reduction valve portion 24 of the left side pressure compensation valve 25 is held at sifted condition. Therefore, the pressure of the load pressure detecting passage 82 is risen until it becomes equal to the discharge pressure (20 kg/cm$^2$) of the hydraulic pump 20. At this time, the pressure of the pump port 44 of the direction control valve 22 for the left side actuator 88 is 100 kg/cm$^2$, the check valve portion 23 of the pressure compensation valve 25 is in the closed condition to be separated from the pressure reduction valve portion 24.

The spool of the pressure reduction valve portion 24 of the pressure compensation valve 25 biases the check valve of the check valve portion 23 in the valve closure direction with the pressure difference (20–10=10 kg/cm$^2$) of two pressure chambers 65 and 66. At this time, the pressure of the pressure chamber a acting in the valve opening direction for the check valve 60 of the check valve portion 23, is 20 kg/cm$^2$ equal to the pump discharge pressure. Therefore, the check valve of the check valve portion 23 is maintained in open position until the pressure at the pump port 44 of the direction control valve 22 becomes 10 kg/cm$^2$. Subsequently, the check valve portion 23 is closed by the spring 69.

By the direction control valve 85 for adjusting the pump, the pump discharge pressure is controlled at a pressure (40 kg/cm$^2$) higher than the pressure of the load pressure detecting passage 82 in the extend of the predetermined pressure difference (20 kg/cm$^2$). Even at this time, the check valve portion 23 of the higher pressure side pressure compensation valve 25 is maintained in closed state, and the spool of the pressure reduction valve 24 is held in the sifted position. Therefore, the pressure in the load pressure detecting passage 82 is risen to 40 kg/cm$^2$. On the other hand, the spool of the pressure reduction valve portion 24 in the lower pressure side pressure compensation valve 25 biases the check valve of the check valve portion 23 in the valve closure direction with the pressure difference (30 kg/cm$^2$) between the load pressure detecting passage 82 and the first passage 53 for introducing the load pressure. As a result, the pressure at the pump port 44 of the lower pressure side direction control valve 22 is maintained at 10 kg/cm$^2$.

As set forth above, the pressures in the load pressure detecting passage 82 and the pump discharge pressure are continuously risen. When the pump discharge pressure reaches the load pressure (100 kg/cm$^2$) of the higher pressure side actuator 88, the pressures in two pressure chambers 65 and 66 of the pressure reduction valve portion 24 of the higher pressure side pressure compensation valve 25 become 100 kg/cm$^2$. Then, the pressure reduction valve portion 24 is closed with the small spring force of the spring 69. Then, the push rod 71 contacts with the check valve 61 of the check valve portion 23. At this time, the spool of the pressure reduction valve portion 24 of the lower pressure side pressure compensation valve 25 biases the check valve in the valve closure direction with the pressure difference (100–10=90 kg/cm$^2$) between the load pressure detecting passage 82 and the first fluid passage 53 for introduction of the load pressure to maintain the pressure at the pump port 44 of the lower pressure side direction control valve at 10 kg/cm$^2$.

By repeating the above-mentioned operation, the pump discharge pressure is controlled at 120 kg/cm$^2$ by the pump adjusting direction control valve 85. At this time, the pressure reduction valve portion 24 of the higher pressure side pressure compensation valve 25 contacts the push rod 71 thereof to the check valve 60 of the check valve portion 23 with only small spring force of the spring 69. The check valve portion 23 is opened by the pressure difference between two pressure chambers a and b to introduce the 120 kg/cm$^2$ of the pump discharge pressure to the pump port 44 of the direction control valve 22. On the other hand, the pressure reduction valve portion 24 of the lower pressure side pressure compensation valve 25 maintains the check valve portion 23 in the closed state with the pressure difference (90 kg/cm$^2$) between the load pressure detecting passage 82 and the first fluid passage 53 for introducing the load pressure. However, at a condition where the pressure of the pressure chamber a for driving the check valve of the check valve portion 23 becomes 30 kg/cm$^2$ (120–90), balance is established in the check valve portion 23 and the pressure reduction valve portion 24. Accordingly, the check valve portion 23 and the pressure reduction portion 24 slightly shifts so that the check valve portion 23 lowers the 120 kg/cm$^2$ of the pump discharge pressure to 30 kg/cm$^2$.

At this condition, the hydraulic control system balances. Then, the pressure at the pump port 44 at the higher pressure side direction control valve 22 becomes 120 kg/cm$^2$ and the pressure at the pump port 44 at the lower pressure side direction control valve 22 becomes 30 kg/cm$^2$. By this, both of the pressure differences of the inlet pressures and the outlet pressures in two direction control valves 22, 22 become 20 kg/cm$^2$. Accordingly, two direction control valves can control the flow rate of the pressurized fluid to be supplied to the actuators 88, 88 only by the shift.

(3)-2 When Total Necessary Flow Rate of Respective Actuators 88 is Greater Than or Equal to Maximum Discharge Amount of Hydraulic Pump Here, the load pressures and the necessary flow rates of the actuators 88, 88 are assumed that 100 kg/cm$^2$ and 501 cm$^3$/min in the left side actuator 88 and 10 kg/cm$^2$ and 501 cm$^3$/min in the right side actuator 88. When the maximum discharge amount of the hydraulic pump 20 is greater than or equal to 1001 cm$^3$/min, since the difference of the inlet pressure and the outlet pressure of the direction control valve 22 can be maintained constant as set forth above, flow rate can be controlled by the shift of the spools to distribute the flow rate for respectively 501 cm$^3$/min.

Next, it is assumed that the maximum discharge amount of the hydraulic pump 20 is 701 cm$^3$/min, since the inlet pressures of two direction control valves 22, 22 are respectively 120 kg/cm$^2$ and 30 kg/cm$^2$, the flow rate of the higher pressure side direction control valve 22 is decreased to be 201 cm$^3$/min. On the other hand, the flow rate of the lower pressure side direction control valve 22 is maintained at 501 cm$^3$/min. Assuming that the shift amount of the spools of two direction control valves 22, 22 are not varied, the pressure difference becomes smaller than the predetermined pressure difference (20 kg/cm$^2$) corresponding to lowering of the pressure difference between the inlet pressure and the outlet pressure in the higher pressure side direction control valve 22. Here, assuming that the pressure difference is decreased to 14 kg/cm$^2$, namely the inlet pressure in the higher pressure side direction control valve is lowered from 120 kg/cm$^2$ to 114 kg/cm$^2$, since the pressures of two pressure chambers 65 and 66 are maintained at 100 kg/cm$^2$, lowering of the pressure of the pressure chamber b of the valve closure direction for the check valve portion 23 should cause shift of the check valve portion 23 to open position (stroke end) to reduce the pressure in the pressure chamber a. Namely, the pump discharge pressure is lowered from 120 kg/cm$^2$ to 114 kg/cm$^2$. At this time (when lack of the pump discharge amount), the pump discharge amount cannot depend on the control of the pump adjusting direction control valve 85.

On the other hand, the pressures of the pressure chambers 65 and 66 of the pressure reduction valve portion 24 of the lower pressure side pressure compensation valve 25 are respectively maintained at 100 kg/cm$^2$ and 10 kg/cm$^2$ to bias the check valve of the check valve portion 23 toward the valve closure direction with the pressure difference (90 kg/cm$^2$). The pressure of the pressure chamber a generating the force in the valve open direction for the check valve portion 23, namely the discharge pressure of the pump is lowered to 114 kg/cm$^2$. Therefore, the balance is established at the reduced pressure from 30 kg/cm$^2$ to 24 kg/cm$^2$ in the pressure chamber b generating the force in the valve closure direction. Accordingly, the pressure difference between the inlet pressure and the outlet pressure of the lower pressure side direction control valve 22 is reduced from 20 kg/cm$^2$ to 14 kg/cm$^2$. The direction control valve 22 reduces the supply flow rate for the lower pressure side actuator 88 from 501 cm$^3$/min corresponding to reduction of the pressure difference. Corresponding to this, the supply flow rate for the higher pressure side actuator 88 is increased from 201 cm$^3$/min.

Namely, balance of the hydraulic system is established at the condition where the pressure differences between the inlet pressure and the outlet pressure of the direction control valves 22, 22 are equal to each other, and the supply flow rates for both actuators 88, 88 are 351 cm$^3$/min.

(4) When Three or More Actuators 88 are loaded for one Hydraulic Pump

When the actuators 88 to be driven hydraulically is more than or equal to three, the foregoing principle of operation can be achieved by arranging another pressure compensation valve 25 including the check valve portion 23 and the pressure reduction valve portion 24 the hydraulic pump and the direction control valve, and introducing the pressure differences in the valve closure direction of respective pressure reduction valve portions to the load pressure detecting passage 82.

Next, the second embodiment of the pressurized fluid supply system according to the present invention will be discussed with reference to FIG. 5. In the following discussion, the elements common to the first embodiment will be represented by the same reference numerals to the first embodiment, and detailed description thereof is neglected for avoiding redundant discussion to keep the description simple enough.

Figure 5:
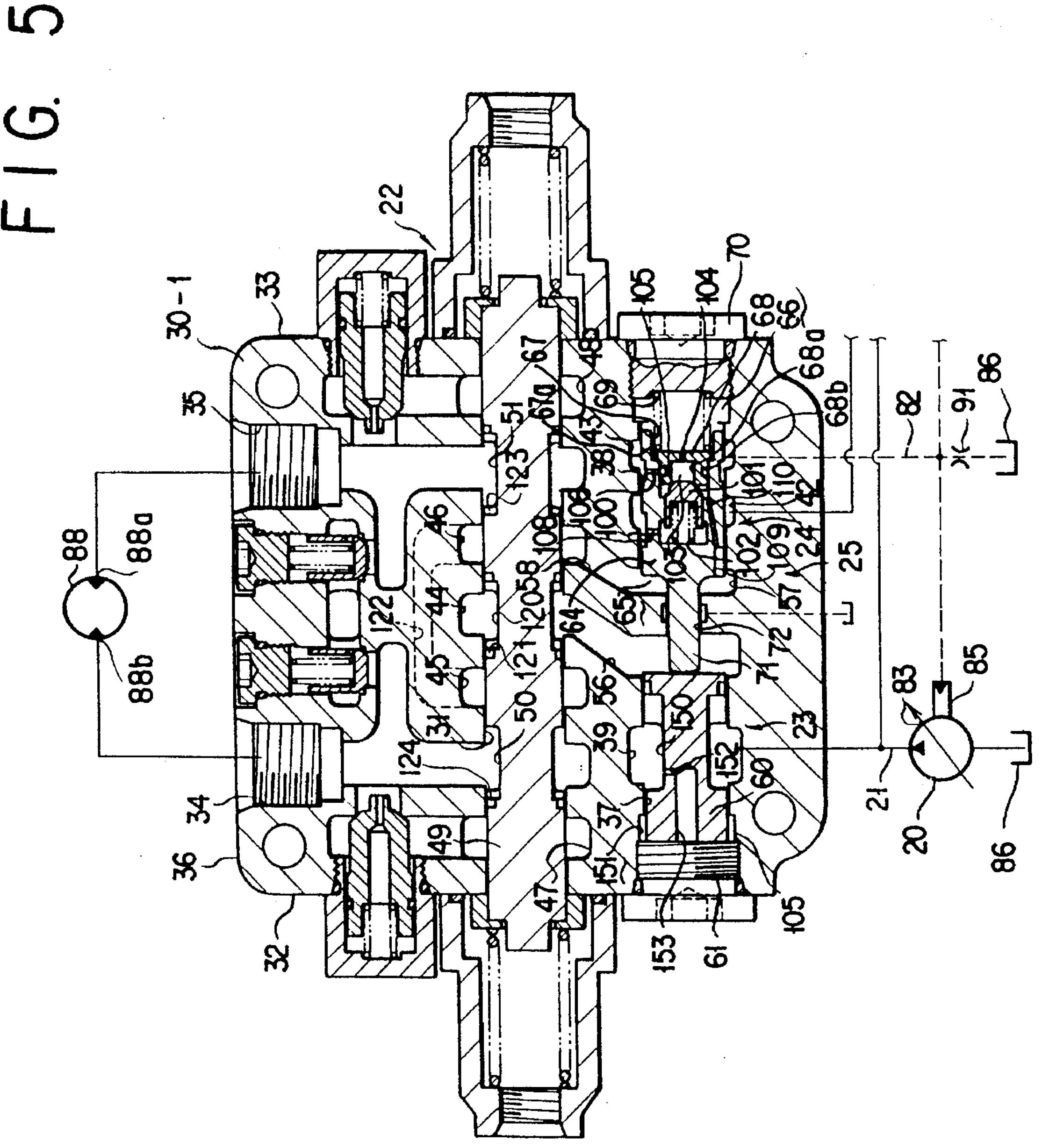
FIG. 5 is a section of a pressurized fluid supply valve block for a hydraulic motor for traveling to be employed in the second embodiment of the invention.

FIG. 5 shows a valve block 30-1 supplying pressurized fluid for left and right hydraulic traveling motors. The main spool 49 of the direction control valve 22 is formed with an intermediate small diameter portion 120 selectively communicating and blocking between the pump port 44 and the first and second load detection ports 45 and 46.

The third port 43 of the pressure reduction valve portion 24 and the second pressure chamber 66 are blocked from communication by the spool 64. The spool 64 is formed with a slip form opening 100 on the outer periphery thereof for selectively communicating and blocking between the third port 43 and the second port 42. The third port 43 is connected to the load pressure detecting passage 82.

The blind bore 67 of the spool 64 is formed into a stepped bore. A sheet 68 is formed into a configuration having a blind hole 68*a* and an annular recess 68*b*. The sheet 68 is contacted to an outward stepped portion 67*a* of the blind bore 67 to be fixed thereon. Between the sheet 68 and a plug 70, a spring 69 is disposed. A check valve 101 is biased to the peripheral edge of the opening of the blind hole 68*a* of the sheet 68 by a spring 102 to define a pressure chamber 103 between the blind hole 68*a* and the check valve 101. The pressure chamber 103 is communicated with the second pressure chamber 66 via a first orifice 104 and with the annular recess 68*b* via a second orifice 105. The annular recess 68*b* opens to the third port 43 via an orifice 106. A spring chamber 107 of the check valve 101 opened to the second port 42 via an orifice 108. On the other hand, the first pressure chamber 65 is communicated with the chamber between the sheet 68 and the check valve 101 via a cut-out portion 109 of the spool 64 and an orifice 110.

Figure 6:
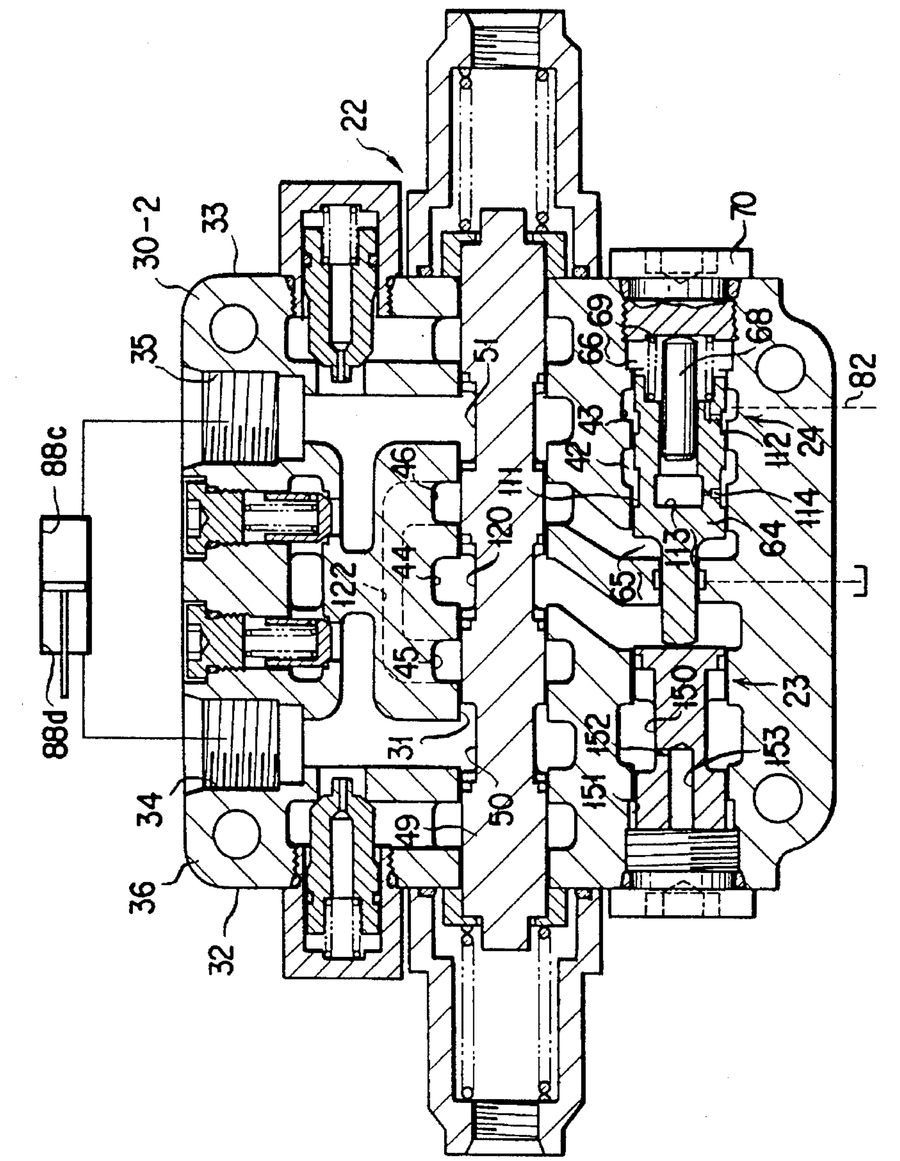
FIG. 6 is a section of a pressurized fluid supply valve block for a work implement cylinder to be employed in the second embodiment of the invention.

FIG. 6 is a section of a valve block 30-2 for supplying a pressurized fluid for a cylinder of a work implement, such as a boom cylinder, for example. The third port 43 of the pressure reduction valve portion 24 and the second pressure chamber 66 are blocked from communication by the spool 64. The spool 64 is formed with a slit form opening 111 for selectively establishing and blocking communication between the third port 43 and the second port 42. The pressurized fluid in the second port 42 is directly supplied to the load pressure detecting passage 82 from the third port 43.

The second pressure chamber 66 is communicated with the third port 43 via a damping orifice 112. On the other hand, a pressure chamber 113 defined by the free piston 68 is communicated with the opening 111 via a damping orifice 114. It should be appreciated that the pressure reduction valve portion 24 may be constructed in the construction shown in FIG. 3.

By the construction set forth above, when the spool 64 slides in left and right, the pressurized fluid in the second pressure chamber 66 flows into the second pressure chamber 66 via the damping orifice 112. Therefore, abrupt shifting of the spool 64 toward right can be prevented. Similarly, when the spool 64 is shifted toward left, the flow of the pressurized fluid opposite to the above is generated to prevent abrupt motion of the spool.

Figure 7:
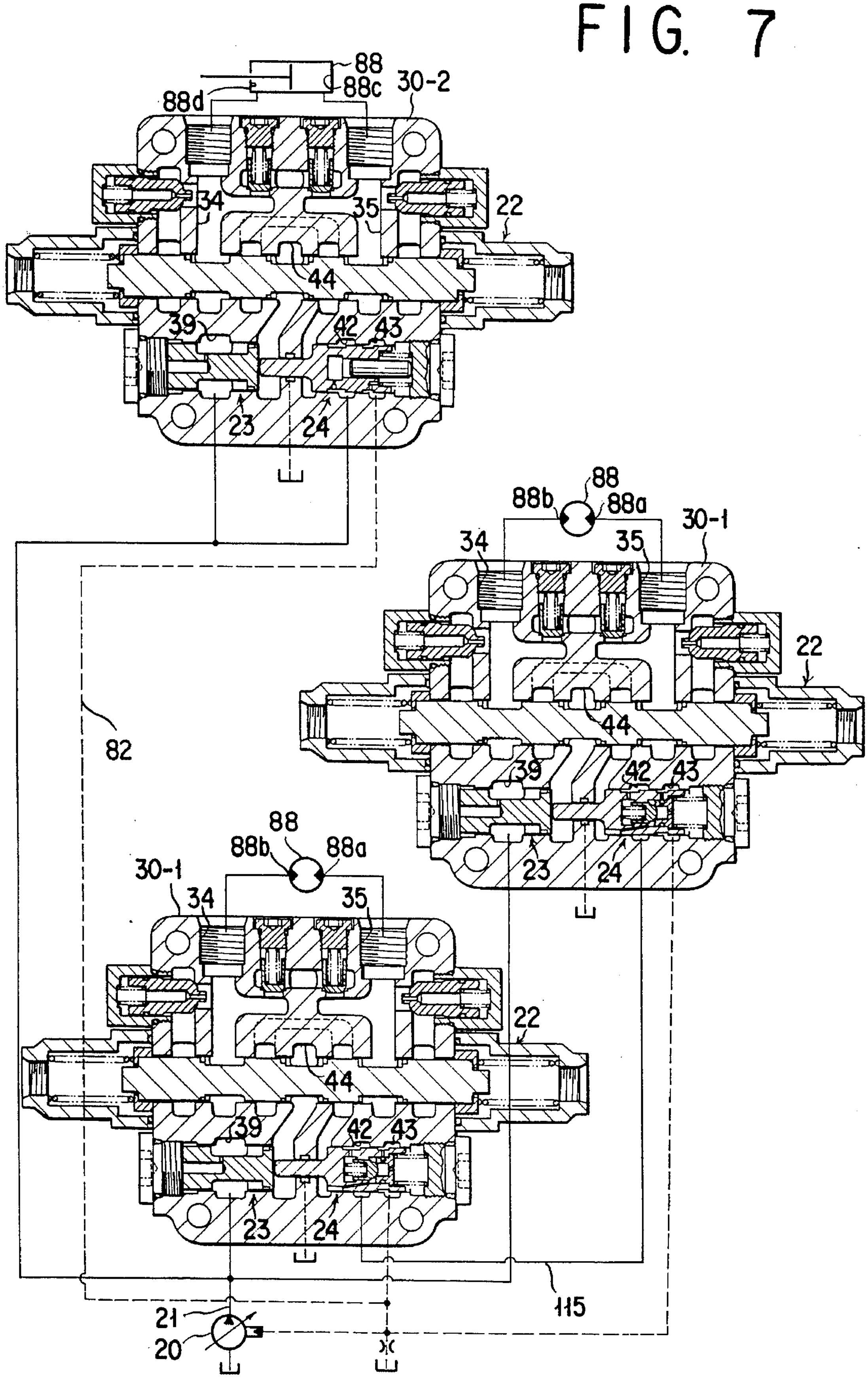
FIG. 7 is a hydraulic circuit diagram of the second embodiment of a pressurized fluid supply system of the present invention, to which the valve blocks of FIGS. 5 and 6 are connected.

FIG. 7 shows an example of a hydraulic system incorporating the valve blocks 30-1 and 30-1 for supplying pressurized fluid for left and right hydraulic traveling motors illustrated in FIG. 5 and the valve block 30-2 for supplying the pressurized fluid for the work implement cylinder illustrated in FIG. 6. The second ports 42 in the pressure reduction valves 24 of the left and right valve blocks 30-1 are communicated with the passage 115. The first and second actuator ports 34 and 35 of these two valve blocks 30-1 are respectively connected to the hydraulic motors as the actuators 88. On the other hand, the discharge line 21 of the hydraulic pump 20 is respectively connected to the first ports 39 of respective valve blocks 30-1 and 30-2. Furthermore, the second port 42 of the valve block 30-2 for supplying the pressurized fluid to the work implement cylinder is also connected to the discharge line 21 of the hydraulic pump 20. The third ports 43 of respective valve blocks 30-1 and 30-2 are connected to the load pressure detecting passage 82, respectively.

Next, discussion will be given for the operation of the hydraulic system in the construction illustrated in FIG. 7.

Straight Traveling

When the main spools 49 of the direction control valves 22 of respective valve blocks 30-1 are slide for shift toward left, the discharged pressurized fluid from the hydraulic pump 20 flows into one of the ports 88*a* of the actuator 88 via the first port 39, a intermediate small diameter portion 120, a left side cut-out portion 121, the first load detection port 45, a communication passage 122, the second load detection port 46, the left side cut-out portion 123, the second small diameter portion 51 and the second actuator port 35 as shown in FIG. 5. On the other hand, a recirculating fluid from the other port 88*b* flows into the first tank port 47 via the first actuator port 34, the first small diameter portion 50 and the first tank port 47 via the first actuator port 34, the first small diameter portion 50 and a left side cut-out 124.

The load pressure of the hydraulic motor as the actuator 88 acts in the first pressure chamber 65 via the second actuator port 35, the second load detection port 46 and the passage 58 to push the spool 64 toward right for shift.

At this time, the pressure in the second port 42 acts on the left side surface of the check valve 101 as introduced into the spring chamber 107 of the check valve 101 via the orifice 108.

On the other hand, into the pressure chamber 103 between the check valve 101 and the blind bore 68*a*, the pressure of the third port 43 is introduced through the orifice 105 to act the hydraulic force to the right side surface of the check valve 101. Since the pressure at the second port 42 and the pressure at the third port 43 are the same, the check valve 101 is seated on the sheet 68 by the spring force of the spring 102.

By this, the cut-out groove 109 of the spool 64 opens to the second port 42 as shown in FIG. 7. Then, for communication through the orifice 115, the load pressures of the left and right hydraulic traveling motors as the left and right actuators 88 connected to the left and right valve blocks 30-1 become equal to each other by communication through the second port 42 and the orifice 115. Furthermore, since the second port is communicated with the third port 43 via the opening 100, the flow rate to be supplied to respective one port 86*a* of the left and right actuators 88 becomes equal to each other to permit straight travel.

In the above-mentioned traveling condition in straight, if the main spool 49 of the direction control valve 22 of the valve block 30-2 for supplying the pressurized fluid to the work implement cylinder is slide toward left, as shown in FIG. 6, the discharge pressurized fluid of the hydraulic pump 20 is supplied to an expansion side pressure chamber 88*c* of the work implement cylinder via the second actuator port 35 from the first port 39 of the valve block 30-2. At this time, the pressurized fluid in a contraction side pressure chamber 88*d* is recirculated to the first tank port 47 from the first actuator port 34.

At this time, since the actuation load of the work implement cylinder, such as boom lifting-up load and so forth becomes greater than the traveling load, the discharge pressure of the hydraulic pump 20 is risen to increase the pressure in the expansion side pressure chamber 88*c* of the work implement cylinder serving as the actuator 88. The increase pressure acts on the first pressure chamber 65 of the spool 64 of the pressure reduction valve 24 to urge the spool 64 toward right to cause sliding of the spool 60 of the check valve portion 23 toward right. Therefore, the discharge pressure of the hydraulic pump is further increased. The discharge pressure of the hydraulic pump 20 acts on the second pressure chamber 66 via the second port 42, the opening 111, the third port 43 and the damping orifice 112 to urge the spool 64 toward left to push the spool 60 of the check valve portion 23 via the push rod 71. Accordingly, the discharge pressure of the hydraulic pump becomes the pressure corresponding to the load pressure by the work implement load.

By this, a control pressure corresponding the load pressure of the work implement cylinder is introduced into the third port 43 of the pressure reduction valve portion 24 of the left and right valve blocks 30-1 from the load pressure detecting passage 82. and then introduced into the second pressure chamber 66 via the orifice 106 of the spool 64, the second orifice 105 of the sheet 68, the pressure chamber 103 and the first orifice 104.

Here, since the traveling load pressure is smaller than the working load pressure, the pressure of the pressure chamber 65 becomes lower than the pressure of the second pressure chamber 66 to cause shift of the spool 64 toward left.

At the same time, by the control pressure in the pressure chamber 103, the check valve 101 is exerted the force in the valve open direction against the spring force of the spring 102. In the spring chamber 107 of the check valve 101, a pressure corresponding to the traveling load of the second pressure chamber acts. Since this pressure is smaller than the control pressure, the check valve 101 opens to permit the control pressure to flow into the first pressure chamber 65 of the spool 64 via the orifice 110 and the cut-out groove 109. The control pressure is bypassed through the passage, the second load pressure detecting port 46 and the second actuator port 35 to the side of the traveling motor.

By this, the control pressure is lowered. Therefore, the discharge amount of the hydraulic pump 20 is not significantly reduced so as to prevent abrupt reduction of the flow rate to be supplied to the left and right hydraulic traveling motors. Accordingly, even when the work implement cylinder performed loaded operation, such as lifting-up of the boom during travel, occurrence of significant deceleration shock can be successfully avoided.

Left or Right Turning

When the main spool 49 of the direction control valve 22 of the right side valve block 30-1 shifts in rightwardly toward the neutral position during travel in straight, the open areas of the second load pressure detection port 46 and the second actuator port 35 are reduced to decrease the flow rate of the working fluid flowing into one port 88*a* of the right side actuator 88.

As a result of this, the load pressure of the right side actuator 88 is lowered. Lowering of the load pressure in the right side actuator 88 causes lowering of the pressure in the first pressure chamber 65 of the pressure reduction valve portion 24 of the right side valve block 30-1. Then, the spool 64 is urged toward left by the load pressure (control pressure) of the second pressure chamber 66 of the left side valve block 30-1, which is supplied through the load pressure detection passage 82 of the second pressure chamber 66. Then, communication between the second port 42 and the first pressure chamber 65 via the cut-out groove 109 is blocked. As a result, the load pressures at the left and right sides becomes not equal to each other. Thus, the load pressure at the right side actuator 88 becomes lower and the load pressure at the left side actuator 88 becomes high to cause right turn on the vehicle.

At this time, the load pressure of the hydraulic motor acting as the left side actuator 88 is introduced into the spring chamber 102 of the check valve 101 of the pressure reduction valve portion of the right side valve block 30-1 via the passage 115, the second port 42 and the orifice 108. Then, the load pressure acts on the left side surface of the check valve 101.

On the other hand, the control pressure acts on the right side surface of the of the check valve 101 via the load pressure detecting passage 82, the third port the orifice 106 of the spool 64 and the second orifice 105. The control pressure is substantially equal to the load pressure of the left side hydraulic traveling motor. the check valve 101 becomes the state contacting with the free piston 68.

Comparing the second embodiment of the pressurized fluid supply system with the first embodiment of the system, in the first embodiment of the pressurized fluid supply system, a flow rate proportional to the open areas of the first and second pressure detection ports 45 and 46 and the first and second actuator ports 34 and 35 is supplied to the first and second actuator ports 34 and 35 irrespective of the load pressure in the actuator 88. Therefore, in the case where the pressurized fluid is supplied to the left and right traveling motors of a hydraulically driven vehicle, it is possible to cause curve traveling instead of straight traveling when the flow rates supplied to be supplied to the left and right hydraulic traveling motors are differentiated due to tolerance of the open areas of the left and right direction control valves. Therefore, high precision is required in machining the direction control valve.

Figure 4:
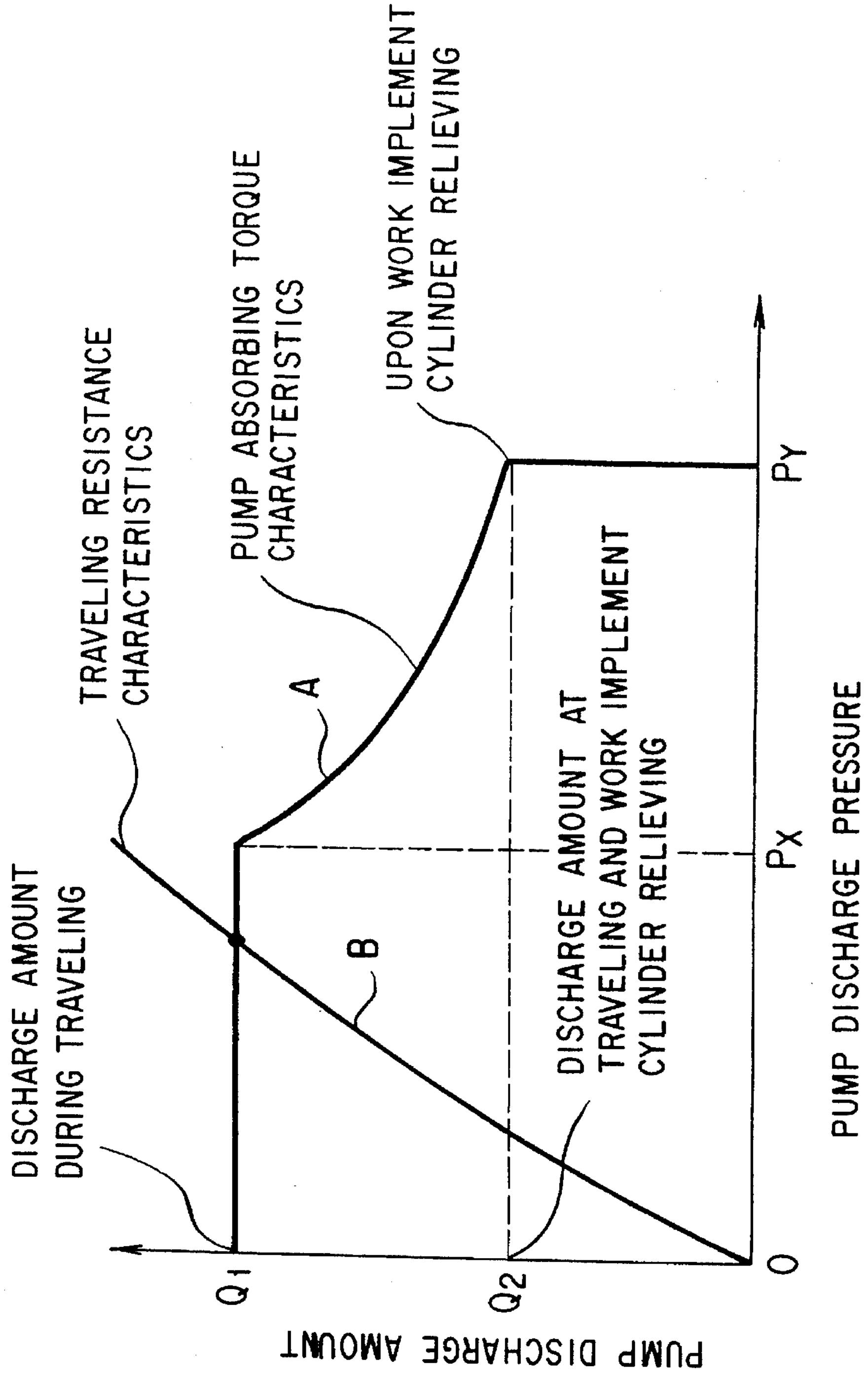
FIG. 4 is an illustration showing a relationship between a pump discharge pressure and a pump discharge amount of a hydraulic pump at traveling state and traveling and work implement operating state.

Furthermore, in the first embodiment of the pressurized fluid supply system, the maximum load pressure (control pressure) of the load pressure detecting passage 82 is exerted to the pump adjusting direction control valve 85 to adjust the discharge amount of the hydraulic pump 20 to increase and decrease depending upon the discharge pressure of the pump, to control the absorbing torque of the hydraulic pump and whereby prevent excessive load on the engine driving the hydraulic pump. For example, as shown in FIG. 4, as shown by A, when the discharge pressure of the pump becomes higher than or equal to the predetermined value $P_X$, the pump discharge pressure is decreased when the control pressure becomes higher than or equal to the predetermined pressure $P_l$.

On the other hand, in the case where the first embodiment of the pressurized fluid supply system supplies the pressurized fluid to left and right hydraulic traveling motors of a power shovel and the work implement cylinder, and when the work implement is actuated by supplying the pump discharged pressurized fluid to the work implement cylinder under the condition of traveling by supplying the pump discharged pressurized fluid to the left and right hydraulic traveling motors, the control pressure is risen with causing reduction of the pump discharge amount to cause abrupt drop of the traveling speed to generate significant deceleration shock since the load pressure of the work implement cylinder becomes greater than the load pressure of the left and right hydraulic traveling motors. For instance, in FIG. 4, the load pressure (pump discharge pressure) of the left and right hydraulic traveling motors while traveling varies according to traveling resistance characteristics B which is lower than the predetermined pressure $P_X$, so the pump discharge amount increases to $Q_1$. However, when the work implement cylinder is operated at a pressure where a relief valve is active for relieving extra pressure, the load pressure (pump discharge pressure) becomes maximum pressure $P_Y$ to reduce the pump discharge amount to $Q_2$.

In contrast to this, in the construction of the second embodiment, when the main spools 49 of the direction control valves 22 of the left and right blocks 30-1 are operated simultaneously in the same direction to supply the pressurized fluid of the hydraulic pump to the first and second actuator ports 34 and 35, the spools of respective pressure reduction valve portions 24 are depressed in the direction against the spring forces with the pressures of the first pressure chambers to establish communication between the first pressure chambers 65 and the second port. Then, the pressures of the second ports 42 of the left and right valve blocks 30-1 become equal to each other to supply the same flow rate of the pressurized fluid to the left and right actuators 88 even when the open area of the direction control valve 22 of the left and right valve blocks 30-1 are differentiated to each other due to tolerance.

Furthermore, in the second embodiment of the pressurized fluid supply system, when the main spool 49 of the direction control valve 22 of the valve block 30-2 is sifted to supply the discharged pressurized fluid of the hydraulic pump 20 to the work implement cylinder while the discharged pressurized fluid of the hydraulic pump 20 is supplied to the left and right hydraulic traveling motors from the left and right valve blocks 30-1, and when the load pressure of the work implement cylinder is higher than the load pressure of the left and right hydraulic traveling motors, the control pressure higher than the load pressure of the left and right traveling motors is generated at the third port 43 of the pressure reduction valve portion 24 of the valve block 30-2. The control pressure flows into the third ports 43 of the left and right valve blocks 30-1 to open the check valves 101 to introduce the controlled pressure to the second pressure chambers 66 through the communication hole. Through the second pressure chambers 66, the control pressure is bypassed to the left and right hydraulic traveling motors to lower the control pressure. Therefore, even when the work implement is operated during travel, the control pressure becomes lower than the pressure corresponding to the work implement load to avoid excessive reduction of the discharge amount of the hydraulic pump 20. Accordingly, the flow rate of the pressurized fluid to be supplied to the left and right hydraulic traveling motors will never varied abruptly, the deceleration shock can be reduced.

In the valve blocks 30-1 and 30-2 shown in FIGS. 5 and 6, by forming a small diameter section 150 on the spool of the check valve portion 23 for selectively establishing and blocking communication between the first port 39 and the pump port 44, and define the pressure chamber 151 for urging the spool 60 toward right in the drawing and the first port to communicate the pressure chamber 151 to the first port 39 via a damping orifice 152 and a communication hole 153. By this, when the spool 60 is sifted toward left and right, the pressurized fluid flows between the first port and the pressure chamber 151 via the damping orifice 152, abrupt behavior of the spool in the left and right direction can be avoided.

Figure 8:
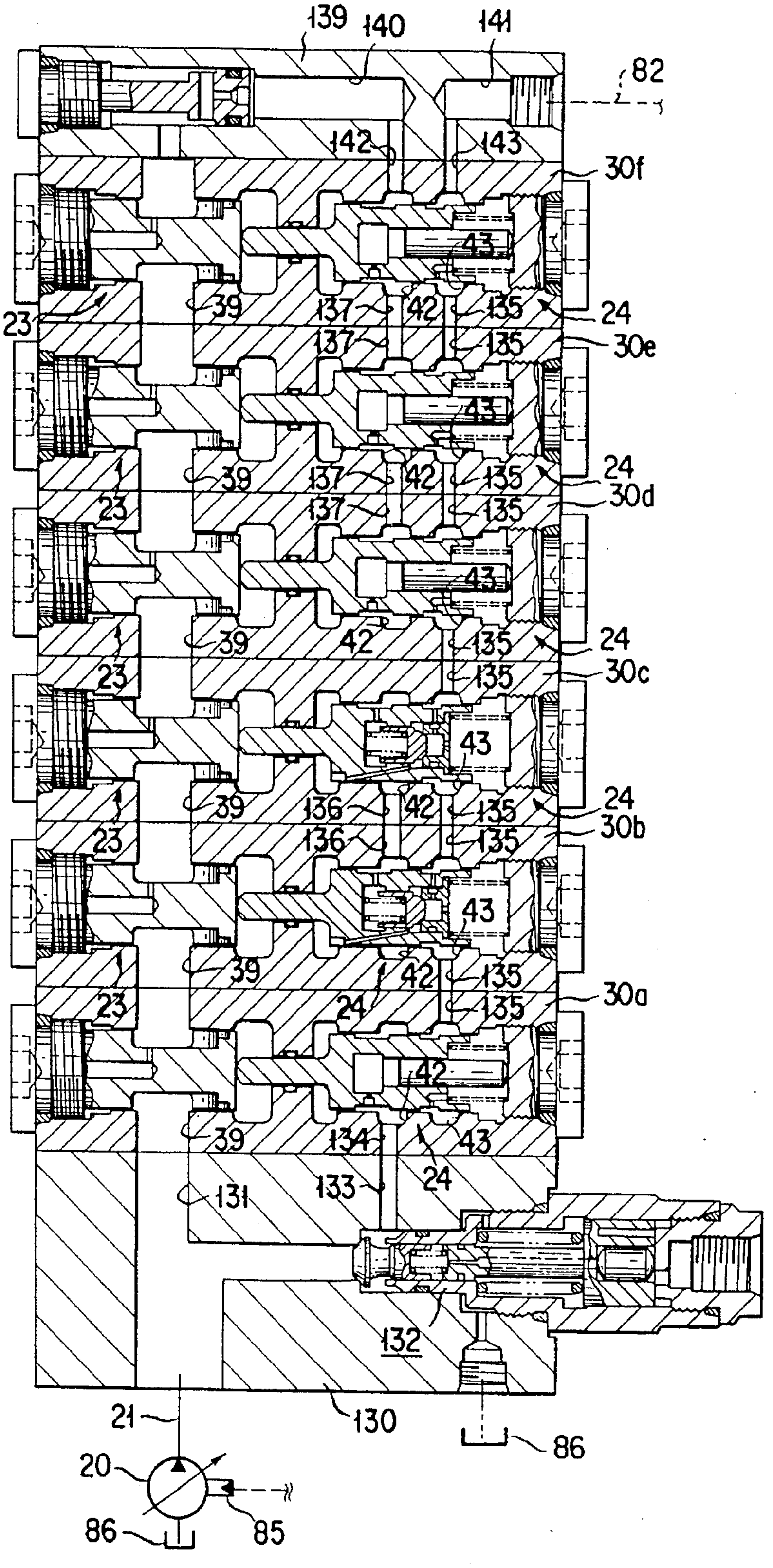
FIG. 8 is a cross section showing an embodiment of the pressurized fluid supply system according to the invention employing a multiple valve.

FIG. 8 shows a cross section of a multiple valve constructed by coupling a plurality of valve blocks with mating front and read faces. In the shown embodiment, there is illustrated an example where first to sixth valve blocks *30a* to *30f* are provided.

In the shown example, the second and third valve blocks *30b* and *30c* correspond to the valve blocks 30-1 for supplying the pressurized fluid to the left and right hydraulic traveling motors of FIG. 5, and the fourth valve block *30d* forms the valve block for supplying the pressurized fluid for the work implement cylinder. To the first valve block *30a*, a first end block 130 is coupled. In the first end block 130, a primary fluid bore 131 connected to the first port 39 is formed. The primary fluid bore 131 is communicated with a fluid bore 13 via a check valve 132. The fluid bore 133 is communicated with the second port 42 of the first valve block 30*a* via a port 134. The third ports 43 of respective valve blocks 30*a* to 30*f* are communicated with each other. The second ports 42 of the second and third valve blocks 30*b* and 30*c* are mutually communicated via a port 136. Similarly, the second ports 42 of the fourth, fifth and sixth valve blocks 30*d*, 30*e* and 30*f* are mutually communicated through a port 137. Also, the first ports of all valve blocks 30*a* to 30*f* are communicated with each other through the primary fluid bore 131.

In the sixth valve block 30*f*, a second end block 139 is coupled. The second end block 139 is formed with a first communication passage 140 and a second communication passage 141 are formed. The first communication passage 140 is communicated with the first port 39 and the second port 42 of the sixth valve block 30*f* via a port 142. The second communication passage 141 is communicated with the third port 43 and the load detection passage 82 via a port 143.

Figure 9:
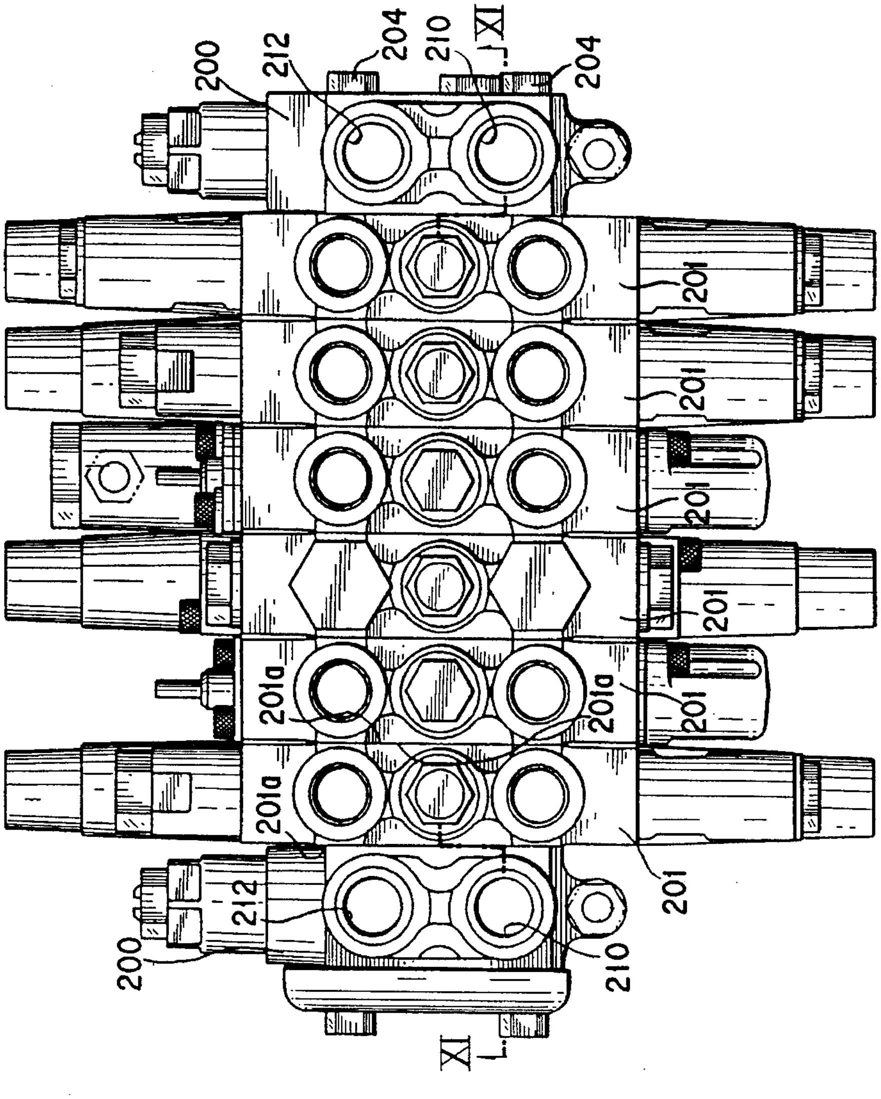
FIG. 9 is a plan view showing another embodiment of the multiple valve.
Figure 10:
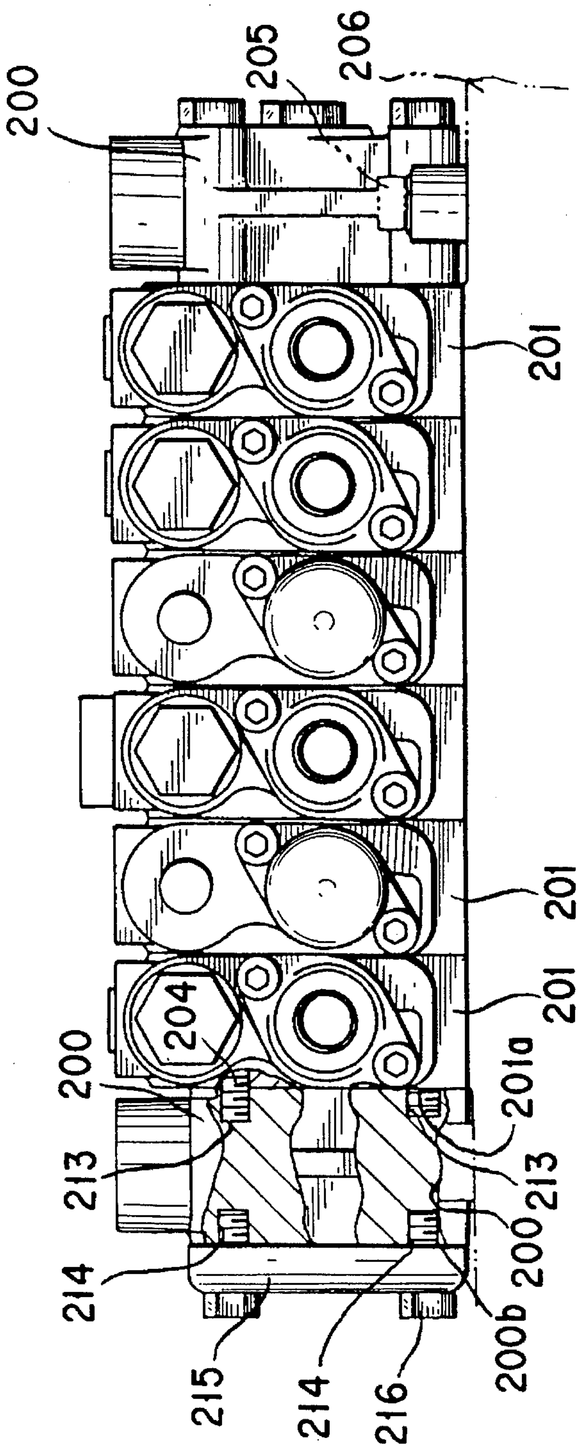
FIG. 10 is a front elevation of the multiple valve of FIG. 9.
Figure 11:
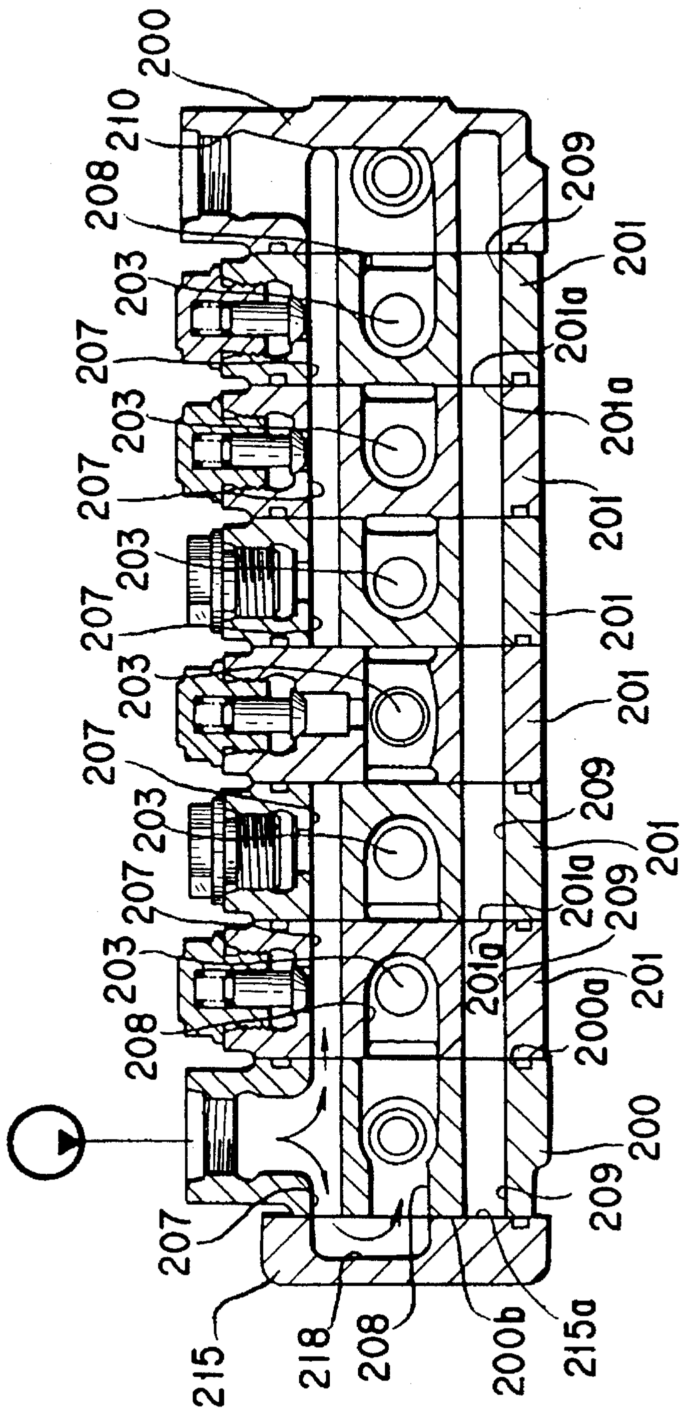
FIG. 11 is a section taken along line XI—XI of FIG. 9.

FIGS. 9 to 11 show the preferred construction of the multiple valve shown in FIG. 8. In FIGS. 9 to 11, a valve body 201 is formed with a pump passage 207, a main passage 208 and a tank passage 209. The valve block 200 is formed with a threaded hole 202 for a stud bolt in one side surface 200*a* mating with one side surface 201*a* of the valve body 201, and a threaded hole 214 for a cover bolt on the other side surface. A stud bolt 204 extends through one valve block 200 and the valve body 201 and threadingly engaged to the threaded hole 202 of the other valve block 200 to rigidly connect therebetween. For the other valve block 200, a cover 215 is mounted by threadingly engaging a cover bolt 216 to the threaded hole 214 therefor. It should be noted that, in the drawings, the reference numeral 203 denotes a spool, 203*a* denotes a spool bore, 205 denotes a mounting screw for mounting the valve block 200 and the valve body to a mounting portion 206 for mounting the multiple valve.

The other valve block 200 is formed with an inlet port 210 and a tank port 212 extending through one side surface 200*a* to the other side surface 200*b*. On one side surface 215*a* of the cover 215, a cut-out groove 218 communicating an inlet passage 207 and a main passage 208 is formed.

Figure 12:
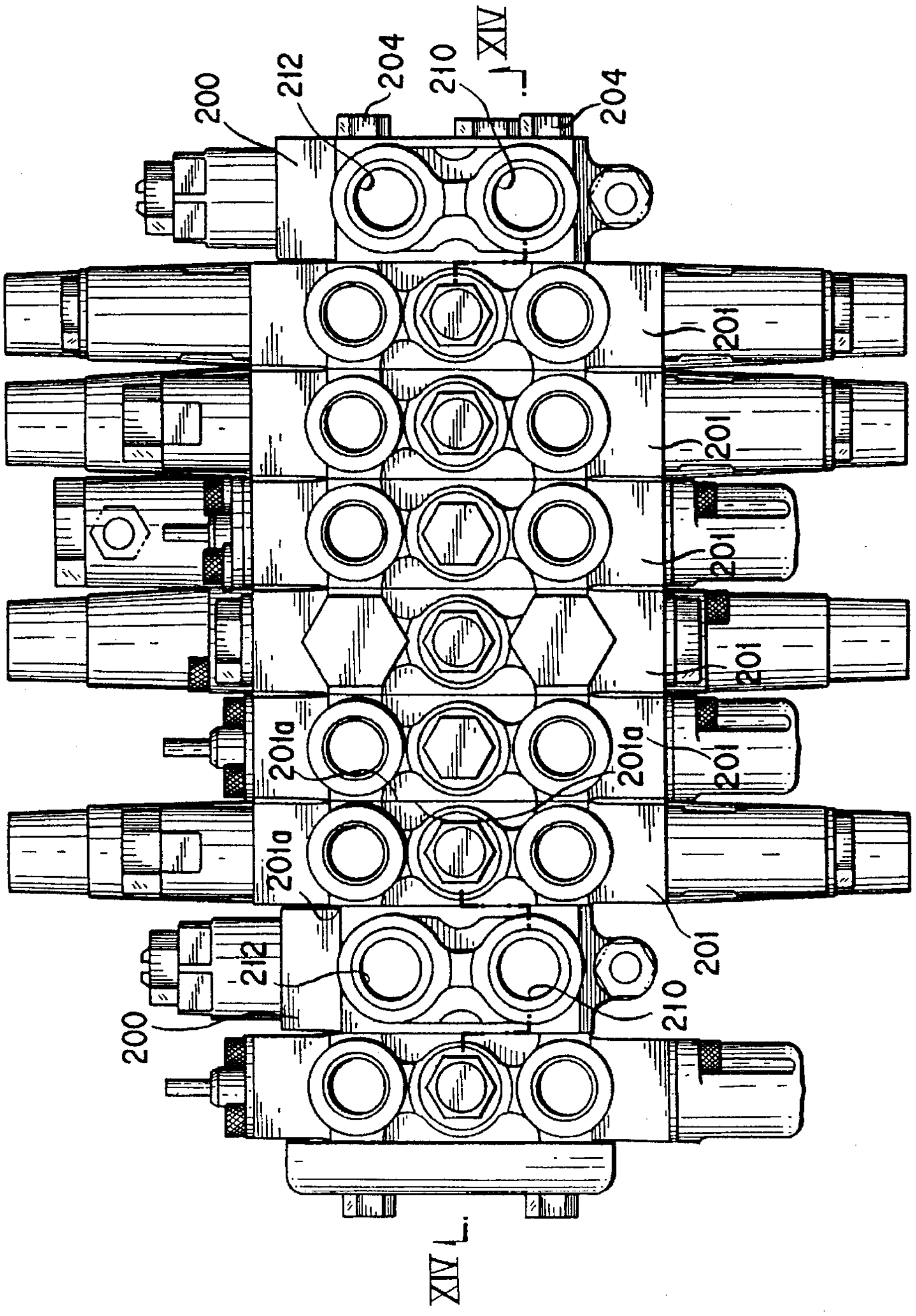
FIG. 12 is a plan view showing a condition where one valve block is added.
Figure 13:
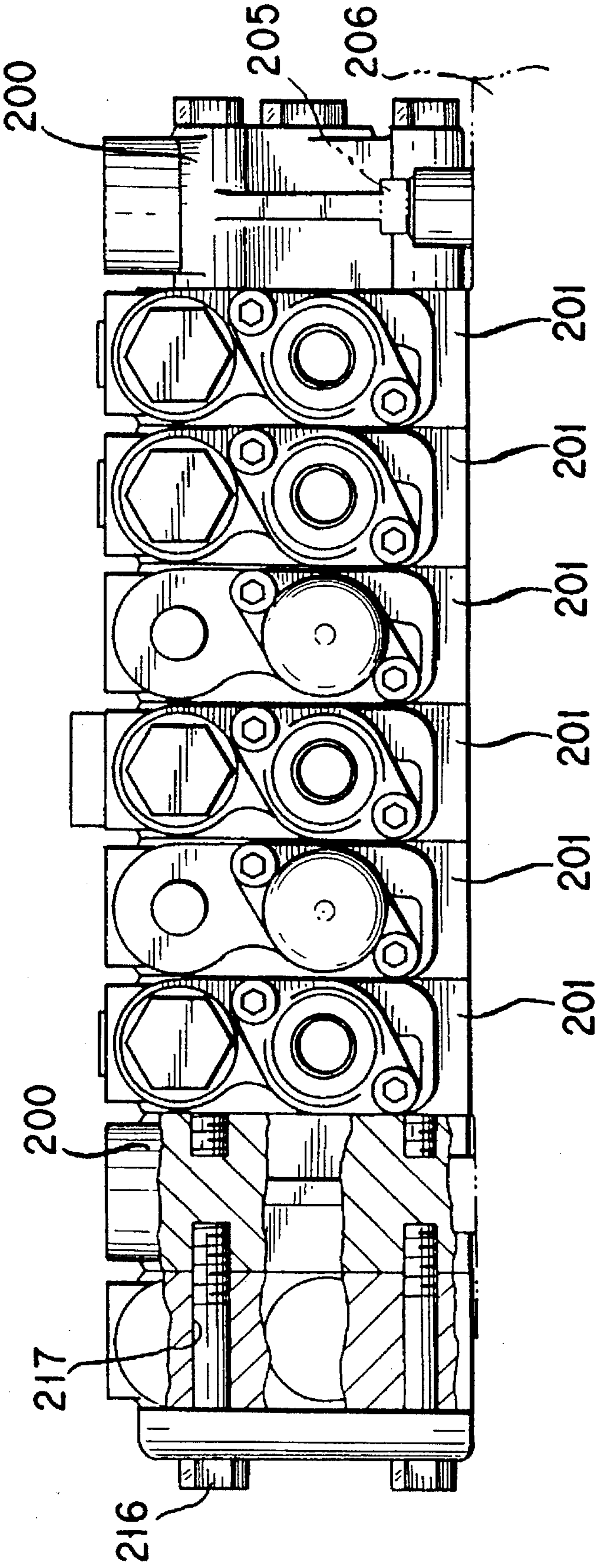
FIG. 13 is a front elevation showing a condition where one valve block is added.
Figure 14:
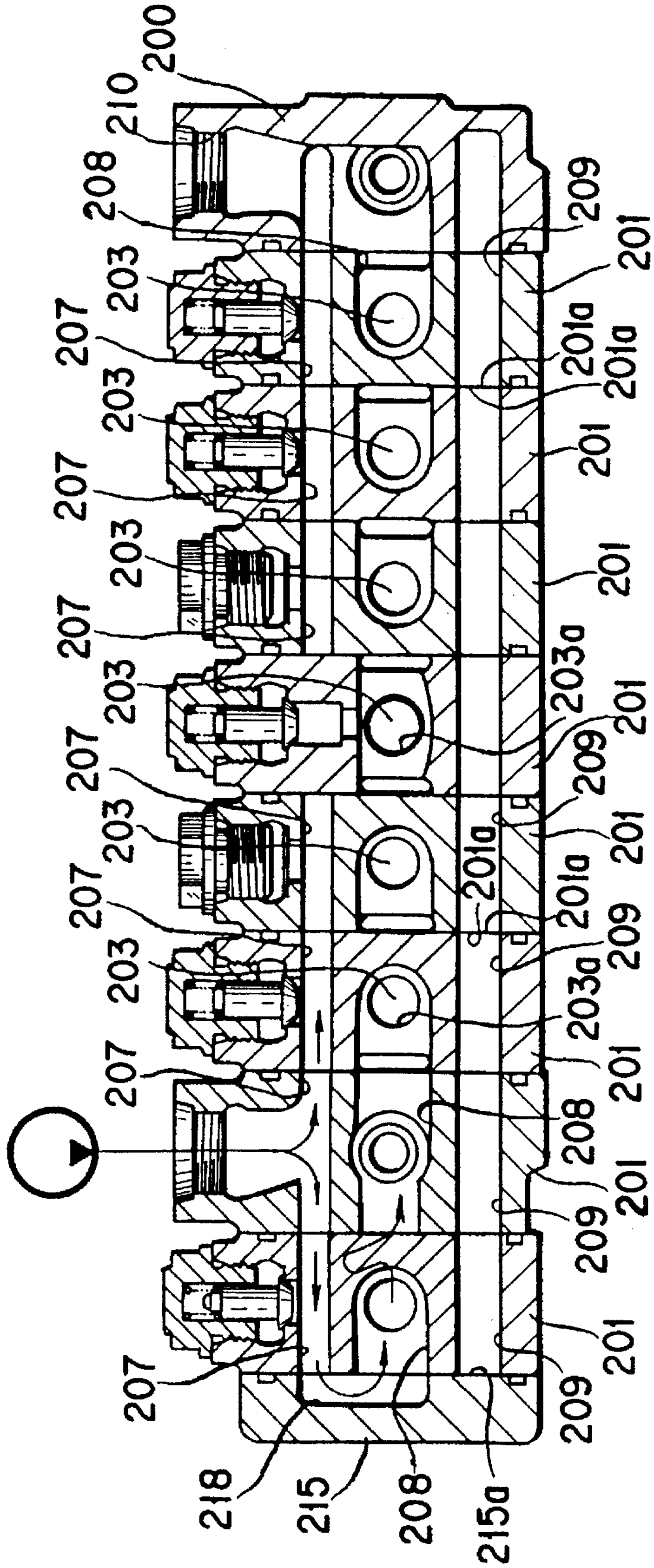
FIG. 14 is a section taken along line XIV—XIV of FIG. 12.

Next, manner of adding one valve block after assembling the multiple valve constructed as set forth above will be discussed with reference to FIGS. 12 to 14.

At first, the cover bolt 216 is loosen to remove the cover 215. Then, the valve body 201 of the valve block to be added is arranged at the other side 200*b* of the other valve block 200. Through a bolt hole 217 extending between both side surfaces 200*a* and 200*b* of the valve body 201, a longer cover bolt 216 is inserted and engaged to the threaded hole 214 for the cover bolt on the other surface 200*b* of the other valve block 200. Thus, the valve body 201 of the new valve block 200 is fixed to the other side surface 200*b* of the other valve block 200. Finally, on one side surface 201*a* of the newly mounted valve body 201, the cover 215 is mounted. By this, the inlet port 210 of the newly added valve block and the main port 211 are communicated through the cut-out groove 218 formed in the cover 215.

Since the multiple valve constructed as set forth above permits mounting of the valve body of the valve block to be added on the other side surface of one valve block when the valve block is added after assembling, the following advantages can be achieved:

(1) it is not necessary to exchange the stud bolt to longer one;

(2) it is not necessary to loosen the stud bolt and the condition of mutual connection of the valve body is not varied so that leakage of the fluid through the connecting portion cannot be caused;

(3) it is not necessary to disassemble after assembling, straightness, circularity of the spool will not be varied so that smooth action of the spool can be attained;

(4) since disposition of the valve block will never be caused, it is not necessary to modify the piping positions to the inlet port and the tank port; and (5) since the mounting hole for one valve block will not cause disposition, it is not necessary to vary the position of the bolt hole in the mounting portion.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

We claim:

1. A pressurized fluid supply system, comprising:

a plurality of pressure compensation valves connected to a pump discharge line of a hydraulic pump in parallel;

direction control valves provided at an outlet side of each pressure compensation valve to supply a discharged pressurized fluid from said hydraulic pump to a plurality of actuators;

each of said pressure compensation valves including a check valve portion establishing and blocking communication between said pump discharge line and an inlet port of said direction control valve, and a pressure reduction valve portion for supplying a reduced pressure from the pump discharge line;

said check valve portion shifting in a valve opening direction in response to an inlet pressure at an inlet side and shifting in a valve closing direction in response to an outlet pressure;

said pressure reduction valve portion comprising a first and a second pressure chamber, with pressure in said first pressure chamber urging a valve element toward a position establishing communication between said inlet side and said outlet side, and a pressure in said second pressure chamber cooperating with a spring to urge the valve element to a position blocking communication between said inlet side and said outlet side, and biasing said check valve portion toward the valve closing direction; and a load pressure of the actuator, to which the pressurized fluid is supplied, being introduced into said first pressure chamber and fluidly connecting all of said second pressure chambers together.

2. A pressurized fluid supply system comprising:

a valve block;

a direction control valve comprising a spool bore, a check valve receptacle bore and a reduction valve receptacle bore in said valve block, opening a pump port, first and second load pressure detection ports, first and second actuator ports and first and second tank ports to said spool bore, and wherein a main spool is slideably inserted in said spool bore for selectively establishing and blocking communication between said respective ports;

a check valve portion comprising a check valve spool inserted in said check valve receptacle bore for establishing and blocking fluid communication between a first port and a fluid passage, wherein said fluid passage communicates with said pump port, said check valve spool being stopped at a blocking position;

a pressure reduction valve portion comprising second and third ports opening to said pressure reduction valve receptacle bore in said valve block, defining first and second pressure chambers at opposite ends of a spool inserted in said pressure reduction valve receptacle bore, said first pressure chamber being communicated with said second load pressure detection port and said second pressure chamber being communicated with said third port, and said spool of said pressure reduction valve being urged by a spring to contact said check valve spool, biasing said check valve spool in the blocking position;

said check valve portion and said pressure reduction valve portion forming a pressure compensation valve;

said spool of said pressure reduction valve portion having a configuration for establishing communication between said first pressure chamber and said second port when said spool of said pressure reduction valve slides against the spring force of said spring by the pressure of said first pressure chamber; and a discharge line of a hydraulic pump being connected to the first ports of a pair of valve blocks, second ports of said pair of valve blocks being communicated with each other, and third ports of said pair of valve blocks being communicated with a load detection passage.

3. A pressurized fluid supply system for distributing pressurized fluid to actuators which include a pair of left and right hydraulic motors for driving left and right driving wheels and an actuator which includes a work implement cylinder for driving a work implement, the pressurized fluid supply system comprising:

a valve block;

a direction control valve comprising a spool bore, a check valve receptacle bore and a reduction valve receptacle bore in said valve block, opening a pump port, first and second load pressure detection ports, first and second actuator ports and first and second tank ports to said spool bore, and wherein a main spool is slideably inserted in said spool bore for selectively establishing and blocking communication between said respective ports;

a check valve portion comprising a check valve spool inserted in said check valve receptacle bore for establishing and blocking fluid communication between a first port and a fluid passage, wherein said fluid passage communicates with said pump port, said check valve spool being stopped at a blocking position;

a pressure reduction valve portion comprising second and third ports opening to said pressure reduction valve receptacle bore in said valve block, defining first and second pressure chambers at opposite ends of a spool inserted in said pressure reduction valve receptacle bore, said first pressure chamber being communicated with said second load pressure detection port and said second pressure chamber being communicated with said third port, and said spool of said pressure reduction valve being urged by a spring to contact said check valve spool, biasing said check valve spool in the blocking position;

said check valve portion and said pressure reduction valve portion forming a pressure compensation valve;

wherein, in the spool of said pressure reduction valve portion of a pair of valve blocks supplying the pressurized fluid for said hydraulic motors for traveling, a communication passage for communicating said third port and said first pressure chamber being formed and a check valve which opens when the pressure of said third port is higher than the pressure of said second port, being provided in said communication passage;

a discharge line of a hydraulic pump being connected to said first port of said pair of valve blocks and to first and second ports of said valve block for supplying the pressurized fluid for said work implement cylinder, the third port of each of said valve blocks being connected to a load detection passage, and said second ports of said pair of left and right valve blocks being communicated with each other.

4. A pressurized fluid supply system for distributing pressurized fluid from a pressurized fluid source to a first hydraulic load and to a second hydraulic load at first and second line pressures depending upon respective load pressures, the pressurized fluid supply system comprising:

first valve means for supplying said first line pressure to said first hydraulic load;

second valve means for supplying said second line pressure to said second hydraulic load;

first load pressure introducing means connected to said first hydraulic load for introducing a first load pressure;

second load pressure introducing means connected to said second hydraulic load for introducing a second load pressure;

first line pressure generating means disposed between said pressurized fluid source and said first valve means and connected to said first load pressure introducing means for generating a first line pressure on the basis of a supply pressure supplied from said pressurized fluid source and said first load pressure for supplying said first valve means with the first line pressure;

second line pressure generating means disposed between said pressurized fluid source and said second valve means and connected to said second load pressure introducing means for generating a second line pressure on the basis of a supply pressure supplied from said pressurized fluid source and said second load pressure for supplying said second valve means with the second line pressure; and discharge pressure control means for controlling discharge pressure of said pressurized fluid source depending upon the first and second line pressures generated by said first and second line pressure generating means;

wherein said first and second line pressure generating means comprise pressure compensation valves, each pressure compensation valve having a check valve portion and a pressure reduction valve portion; and wherein said pressure reduction valve portion of each of said pressure compensation valves comprises a load pressure feedback chamber and a supply pressure chamber opposing opposite ends of a pressure reduction valve body, and shifting said pressure reduction valve body depending upon the load pressure introduced via a corresponding one of said first and second load pressure introducing means for establishing and blocking communication between said supply pressure chamber and said pressurized fluid source to generate a pilot pressure to be supplied to said discharge pressure control means.

5. A system as set forth in claim 4, wherein said first and second valve means comprise direction control valves for reversing operating directions of corresponding first and second hydraulic loads by reversing supply direction of the pressurized fluid.

6. A system as set forth in claim 4, wherein said pressure reduction valve portion comprises a supply side port communicated with said supply pressure chamber and a feedback side port communicated with said load pressure feedback chamber at the valve open position, a communication passage for communicating said feedback side port to said supply side chamber, and a check valve is disposed in said communication passage so that said check valve is opened when a pressure at said feedback side port is higher than a pressure of said supply side port.

7. A pressurized fluid supply system for distributing pressurized fluid from a pressurized fluid source to a first hydraulic load and to a second hydraulic load at first and second line pressures depending upon respective load pressures, the pressurized fluid supply system comprising:

first valve means for supplying said first line pressure to said first hydraulic load;

second valve means for supplying said second line pressure to said second hydraulic load;

first load pressure introducing means connected to said first hydraulic load for introducing a first load pressure;

second load pressure introducing means connected to said second hydraulic load for introducing a second load pressure;

first line pressure generating means disposed between said pressurized fluid source and said first valve means and connected to said first load pressure introducing means for generating a first line pressure on the basis of a supply pressure supplied from said pressurized fluid source and said first load pressure for supplying said first valve means with the first line pressure;

second line pressure generating means disposed between said pressurized fluid source and said second valve means and connected to said second load pressure introducing means for generating a second line pressure on the basis of a supply pressure supplied from said pressurized fluid source and said second load pressure for supplying said second valve means with the second line pressure; and discharge pressure control means for controlling discharge pressure of said pressurized fluid source depending upon the first and second line pressures generated by said first and second line pressure generating means;

wherein said first and second line pressure generating means comprise pressure compensation valves, each pressure compensation valve having a check valve portion and a pressure reduction valve portion; and wherein said check valve portion of each of said pressure compensation valves comprises a valve opening side pressure chamber exerting a supply pressure of said pressurized fluid source to a check valve body in a valve opening direction, and means for exerting a force corresponding to a pressure difference between a pressure of a load pressure feedback chamber of said pressure reduction valve portion and a pressure of a supply pressure chamber to said check valve body in a valve closing direction, for generating said first and second line pressures depending upon the supply pressure and the pressure difference.

8. A system as set forth in claim 7, wherein said first and second valve means comprise direction control valves for reversing operating directions of corresponding first and second hydraulic loads by reversing supply direction of the pressurized fluid.

9. A pressurized fluid supply system for distributing pressurized fluid from a pressurized fluid source to a first hydraulic load and to a second hydraulic load at first and second line pressures depending upon respective load pressures, the pressurized fluid supply system comprising:

first valve means for supplying said first line pressure to said first hydraulic load;

second valve means for supplying said second line pressure to said second hydraulic load;

first load pressure introducing means connected to said first hydraulic load for introducing a first load pressure;

second load pressure introducing means connected to said second hydraulic load for introducing a second load pressure;

first line pressure generating means disposed between said pressurized fluid source and said first valve means and connected to said first load pressure introducing means for generating a first line pressure on the basis of a supply pressure supplied from said pressurized fluid source and said first load pressure for supplying said first valve means with the first line pressure;

second line pressure generating means disposed between said pressurized fluid source and said second valve means and connected to said second load pressure introducing means for generating a second line pressure on the basis of a supply pressure supplied from said pressurized fluid source and said second load pressure for supplying said second valve means with the second line pressure; and discharge pressure control means for controlling discharge pressure of said pressurized fluid source depending upon the first and second line pressures generated by said first and second line pressure generating means;

wherein said first and second line pressure generating means comprise pressure compensation valves, each pressure compensation valve having a check valve portion and a pressure reduction valve portion; and wherein said pressure reduction valve portion of each of said pressure compensation valves comprises a pressure reduction valve body which is displaced depending upon a pressure difference between a pressure of a load pressure feedback chamber and a pressure of a supply pressure chamber, said pressure reduction valve body being shifted in an opening direction when the pressure of said load pressure feedback chamber becomes higher beyond a predetermined pressure difference relative to the pressure of said supply pressure chamber, for establishing communication between said pressurized fluid source and said supply pressure chamber.

10. A system as set forth in claim 9, wherein said first and second valve means comprise direction control valves for reversing operating directions of corresponding first and second hydraulic loads by reversing supply direction of the pressurized fluid.

11. A system as set forth in claim 9, wherein:

said pressure reduction valve portion comprises:

a supply side port which communicates with said supply pressure chamber when the pressure reduction valve is open; and a feedback side port which communicates with said load pressure feedback chamber when the check valve is open position;

said supply side port of said first line pressure generating means and the supply side port of said second line pressure generating means are communicated with each other; and the feedback side ports of said first and second line pressure generating means are commonly connected to said discharge pressure control means.

12. A system as set forth in claim 9, wherein said pressure reduction valve portion comprises a supply side port communicated with said supply pressure chamber and a feedback side port communicated with said load pressure feedback chamber at the valve open position, a communication passage for communicating said feedback side port to said supply side chamber, and a check valve is disposed in said communication passage so that said check valve is opened when a pressure at said feedback side port is higher than a pressure of said supply side port.

* * * * *